United States Patent
Hori et al.

(10) Patent No.: US 11,444,358 B2
(45) Date of Patent: Sep. 13, 2022

(54) MANUFACTURING METHOD FOR FUEL CELL SEPARATORS AND MANUFACTURING APPARATUS FOR FUEL CELL SEPARATORS

(71) Applicant: HONDA MOTOR CO., LTD., Tokyo (JP)

(72) Inventors: Yuichi Hori, Tochigi (JP); Tomotsugu Takahashi, Tochigi (JP); Kei Matsumoto, Tochigi (JP); Seitaro Nakamura, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 49 days.

(21) Appl. No.: 17/213,249

(22) Filed: Mar. 26, 2021

(65) Prior Publication Data

US 2021/0305657 A1  Sep. 30, 2021

(30) Foreign Application Priority Data

Mar. 31, 2020 (JP) .............................. JP2020-063537

(51) Int. Cl.
*H01M 50/406* (2021.01)
*H01M 8/0254* (2016.01)
*H01M 8/0206* (2016.01)

(52) U.S. Cl.
CPC ....... *H01M 50/406* (2021.01); *H01M 8/0254* (2013.01); *H01M 8/0206* (2013.01)

(58) Field of Classification Search
CPC .................................................. H01M 50/406
See application file for complete search history.

(56) References Cited

U.S. PATENT DOCUMENTS

2016/0129491 A1* 5/2016 Taguchi ................. B21D 25/02
72/296
2019/0326612 A1* 10/2019 Oba ..................... H01M 8/0232

FOREIGN PATENT DOCUMENTS

JP          2014078336 A       5/2014

* cited by examiner

*Primary Examiner* — Brian R Ohara
(74) *Attorney, Agent, or Firm* — CKC & Partners Co., LLC

(57) ABSTRACT

A manufacturing method for fuel cell separators by way of a progressive pressing method which molds a plurality of separator shaped parts in an elongated metal plate, the method having: a pressing step of forming a separator shaped part in an elongated metal plate by way of pressing; a trimming step of cutting loose the separator shaped part from the elongated metal plate by punching an outer peripheral part of the separator shaped part formed in the elongated metal plate in the same pressing direction as the pressing step; a lifting step of lifting up the elongated metal plate from which the separator shaped part was cut loose; and a separator shaped part conveying step of conveying the separator shaped part which was cut loose to a downstream side in the conveying direction, in the midst of the elongated metal plate being lifted up in the lifting step.

8 Claims, 20 Drawing Sheets

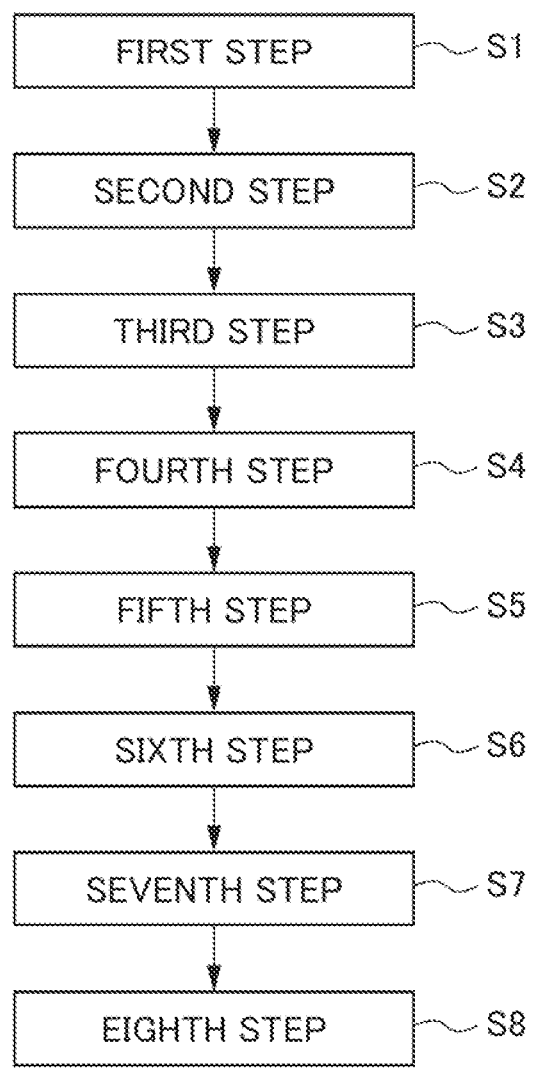

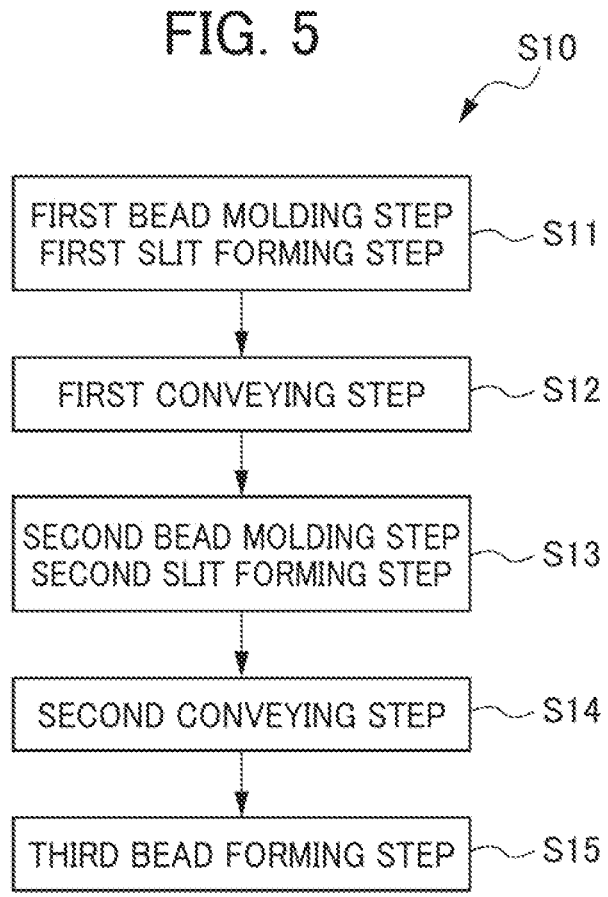

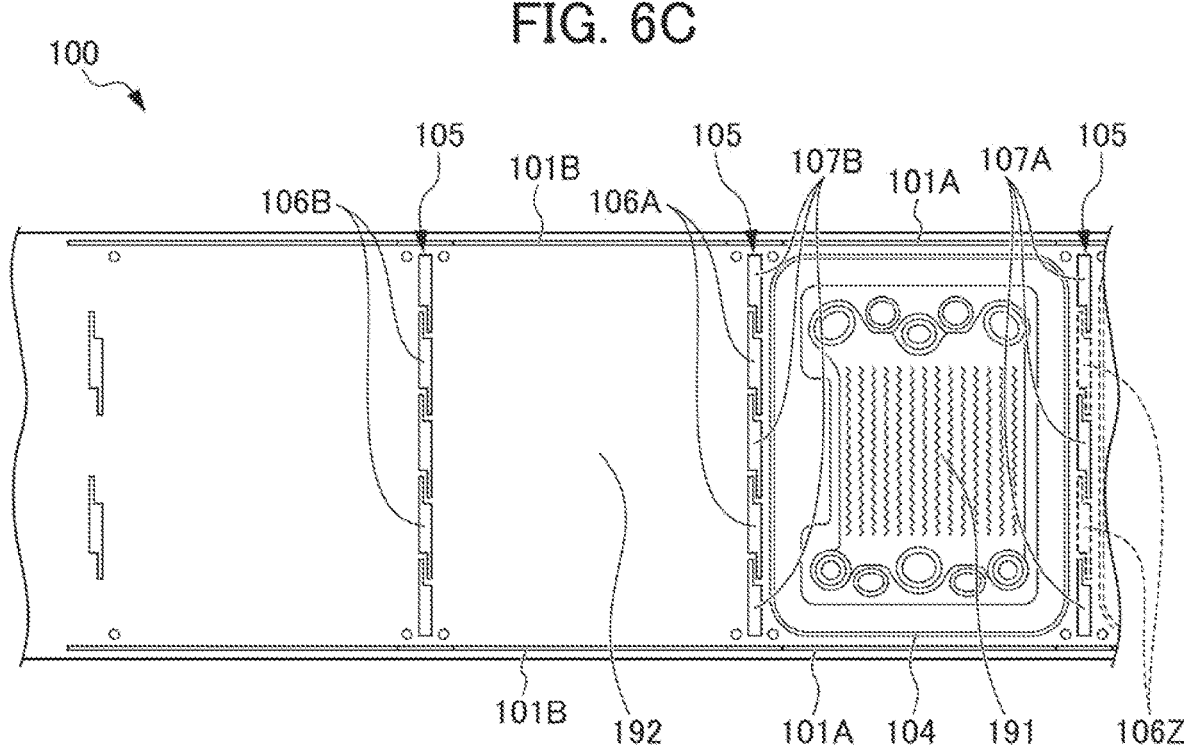
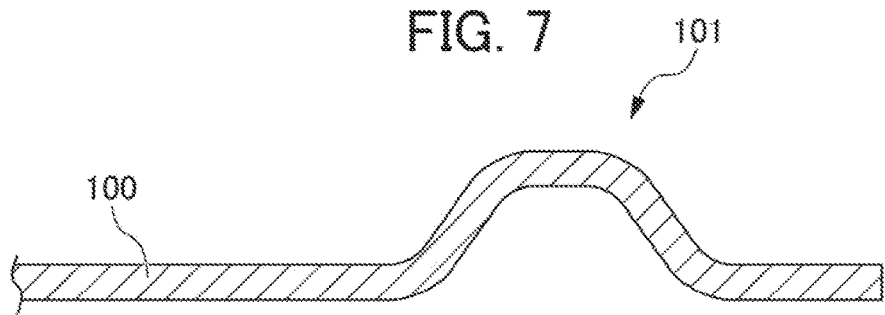

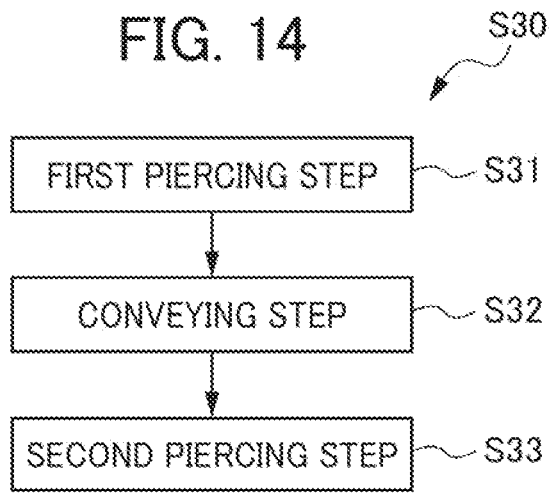
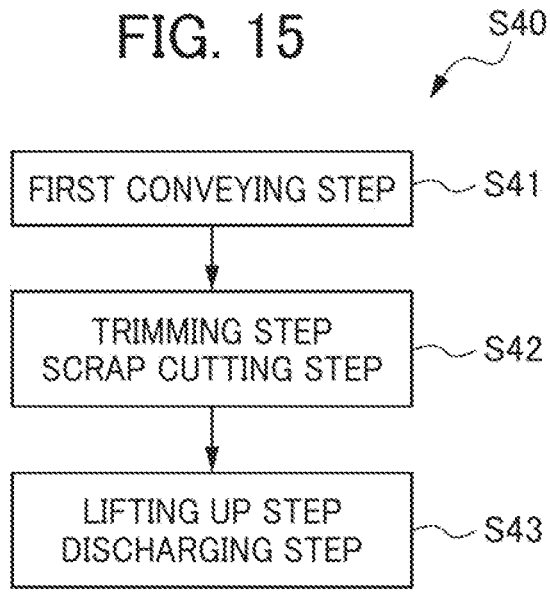

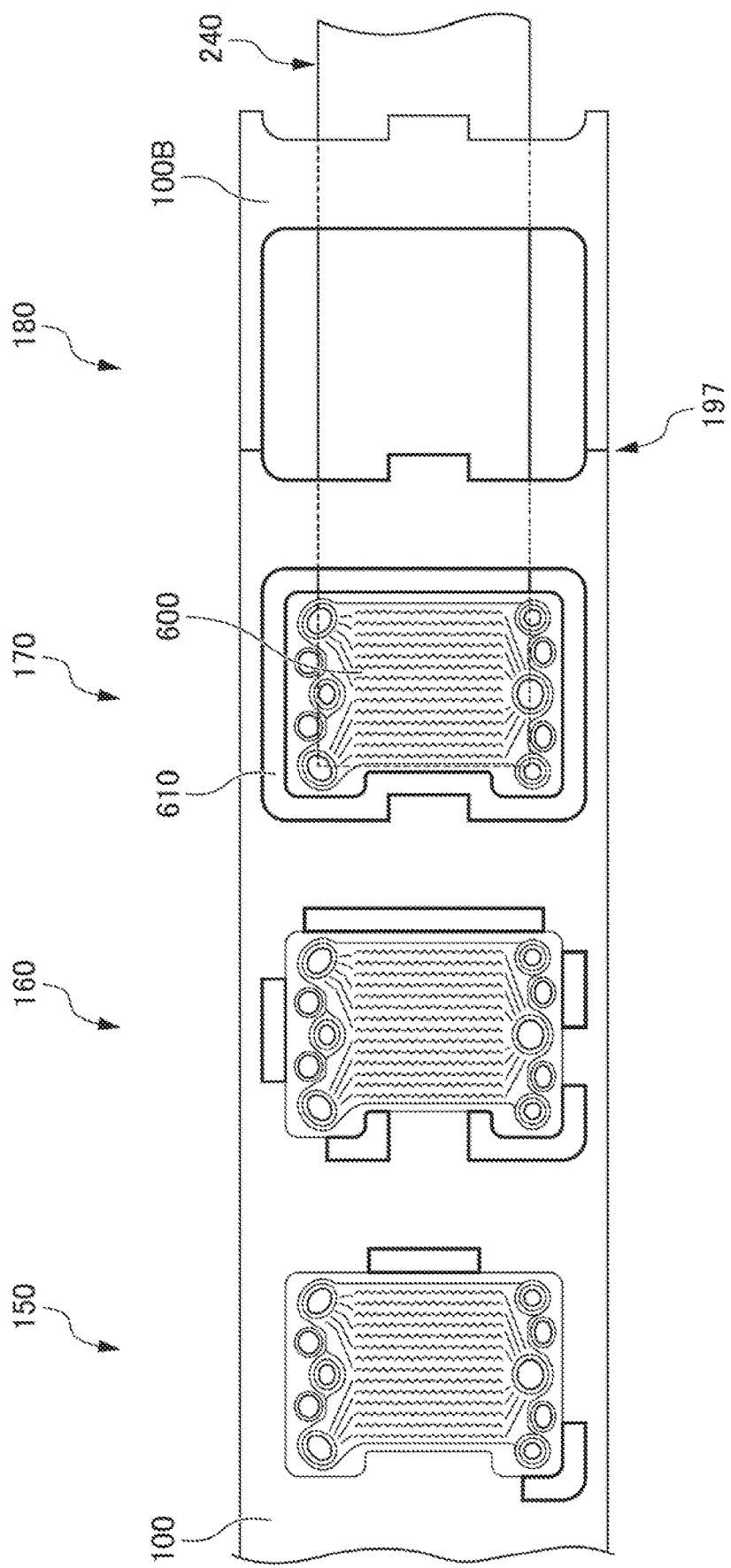

MANUFACTURING METHOD FOR FUEL CELL SEPARATORS AND MANUFACTURING APPARATUS FOR FUEL CELL SEPARATORS

This application is based on and claims the benefit of priority from Japanese Patent Application 2020-063537, filed on 31 Mar. 2020, the content of which is incorporated herein by reference.

BACKGROUND OF THE INVENTION

Field of the Invention

The present invention relates to a manufacturing method for fuel cell separators, and a manufacturing apparatus for fuel cell separators.

Related Art

Conventionally, a manufacturing apparatus for fuel cell separators which molds a separator as a product part has been known. For example, Patent Document 1 discloses a manufacturing apparatus for fuel cell separators which molds the shape of a fuel cell separator into a raw material metal plate of elongated shape.

Patent Document 1: Japanese Unexamined Patent Application, Publication No. 2014-78336

SUMMARY OF THE INVENTION

In the manufacturing apparatus of Patent Document 1, in a trimming step, the separator as a product part is made as a punch out. The manufacturing apparatus of Patent Document 1 in no way considers the generation of burrs occurring by punching.

The present invention has been made taking account of the above, and an object thereof is to provide a manufacturing method for fuel cell separators which molds by way of a progressive pressing method, and can appropriately execute discharge of a separator as a product part, while considering the generation of burrs occurring by punching.

A manufacturing method for fuel cell separators according to a first aspect of the present invention is a manufacturing method for fuel cell separators by a progressive pressing method which molds a plurality of separator shaped parts (for example, the separator shaped part 600) in an elongated metal plate (for example, the elongated metal plate 100), and includes: a pressing step of forming a separator shaped part by pressing in the elongated metal plate; a trimming step of cutting loose the separator shaped part from the elongated metal plate, by punching an outer peripheral part (for example, the outer peripheral part 610) of the separator shaped part formed in the elongated metal plate, in a pressing direction which is the same as the pressing step; a lifting step of lifting up the elongated metal plate from which the separator shaped part was cut loose; and a separator shaped part conveying step of conveying the separator shaped part that was cut loose to a downstream side in a conveying direction, while the elongated metal plate being lifted up in the lifting step. It is thereby possible to provide a manufacturing method for fuel cell separators which molds by way of a progressive pressing method, and can appropriately execute discharge of a separator as a product part, while considering the generation of burrs occurring by punching.

According to a second aspect of the present invention, in the manufacturing method for fuel cell separators as described in the first aspect, the separator shaped part may have a hole part (for example, the hole part 530, 540), and the hole part and outer peripheral part of the separator shaped part may be punched in the same punching direction in the pressing step and the trimming step. It is thereby possible to facilitate processing work of burrs, etc. in subsequent steps, while enabling to efficiently manufacture separator shaped parts by the progressive pressing method.

According to a third aspect of the present invention, in the manufacturing method for fuel cell separators as described in the first or second aspect, the separator shaped part may have a convex part (for example, the convex part 198) which is molded so that an upper side becomes a convex shape in the pressing step. It thereby becomes possible to prevent interference between burrs generated by punching of the separators and another member, upon assembling the convex part of the separator towards another member, while enabling to efficiently manufacture separator shaped parts by the progressive pressing method.

According to a fourth aspect of the present invention, in the manufacturing method for fuel cell separators as described in any one of the first to third aspects, the lifting step may lift up the elongated metal plate which was cut loose, using a hook part (for example, the hook part 73) provided to an upper mold used in order to cut loose the separator shaped part in the trimming step. It is possible to easily lift up the elongated metal plate, by hanging the elongated metal plate from which the separator shaped part was cut loose, using the hook part.

A manufacturing apparatus for fuel cell separators (for example, the manufacturing apparatus for fuel cell separators 1) according to a fifth aspect of the present invention is a manufacturing apparatus for fuel cell separators which molds a plurality of separator shaped parts in an elongated metal plate by way of a progressive pressing method, and includes: a pressing part (for example, the pressing parts 30 to 60) which forms a separator shaped part in the elongated metal plate by way of pressing; a trimming part (for example, the trimming part 70) which cuts loose the separator shaped part from the elongated metal plate, by way of punching an outer peripheral part of the separator shaped part formed in the elongated metal plate, in a pressing direction which is the same as the pressing direction by the pressing part; a lifting part which lifts up the elongated metal plate from which the separator shaped part was cut loose; and a separator shaped part conveying part (for example, the separator shaped part conveying part 240) which conveys the separator shaped part which was cut loose to a downstream side in a conveying direction, while the elongated metal plate being lifted up by the lifting part. It is thereby possible to provide a manufacturing apparatus for fuel cell separators which molds by way of the progressive pressing method and can appropriately execute discharge of separators as product parts, while considering the generation of burrs occurring by punching.

According to a sixth aspect of the present invention, in the manufacturing apparatus for fuel cell separators as described in the fifth aspect, the separator shaped part may have a hole part, and a punching direction of the hole part by the pressing part, and a punching direction of an outer peripheral part of the separator shaped part by the trimming part may be the same punching direction. The processing work of burrs, etc. in subsequent steps thereby becomes easy, while enabling to efficiently manufacture separator shaped parts by the progressive pressing method.

According to a seventh aspect of the present invention, in the manufacturing apparatus for fuel cell separators as described in the fifth or sixth aspect, the separator shaped part may have a convex part molded so that an upper side becomes a convex shape by way of pressing by the pressing part. It thereby becomes possible to prevent interference between burrs generated by punching of the separators and another member, upon assembling the convex part of the separator towards another member, while enabling to efficiently manufacture separator shaped parts by the progressive pressing method.

According to an eighth aspect of the present invention, in the manufacturing apparatus for fuel cell separators as described in any one of the fifth to seventh aspects, a hook part for lifting up the elongated metal plate from which the separator shaped part was cut loose may be provided to an upper mold of the trimming part. It is possible to easily lift up the elongated metal plate, by hanging the elongated metal plate from which the separator shaped part was cut loose, using the hook part.

According to the present invention, it is possible to provide a manufacturing method for fuel cell separators which molds by way of a progressive pressing method, and can appropriately execute discharge of a separator as a product part, while considering the generation of burrs occurring by punching.

BRIEF DESCRIPTION OF THE DRAWINGS

FIG. 4 is a flowchart showing a process executed by each pressing part on one product part;

FIG. 5 is a flowchart of a bead and slit forming step of the present embodiment;

FIG. 6C is a view showing a state of an elongated metal plate molded by a third molding step;

FIG. 7 is a cross-sectional view along the line E-E in FIG. 6A;

FIG. 14 is a flowchart of a piercing process of the present embodiment;

FIG. 15 is a flowchart of a trimming and discharging step of the present embodiment;

FIG. 16 is a plan view of an elongated metal plate conveyed by a conveying part;

DETAILED DESCRIPTION OF THE INVENTION

Figure 1:
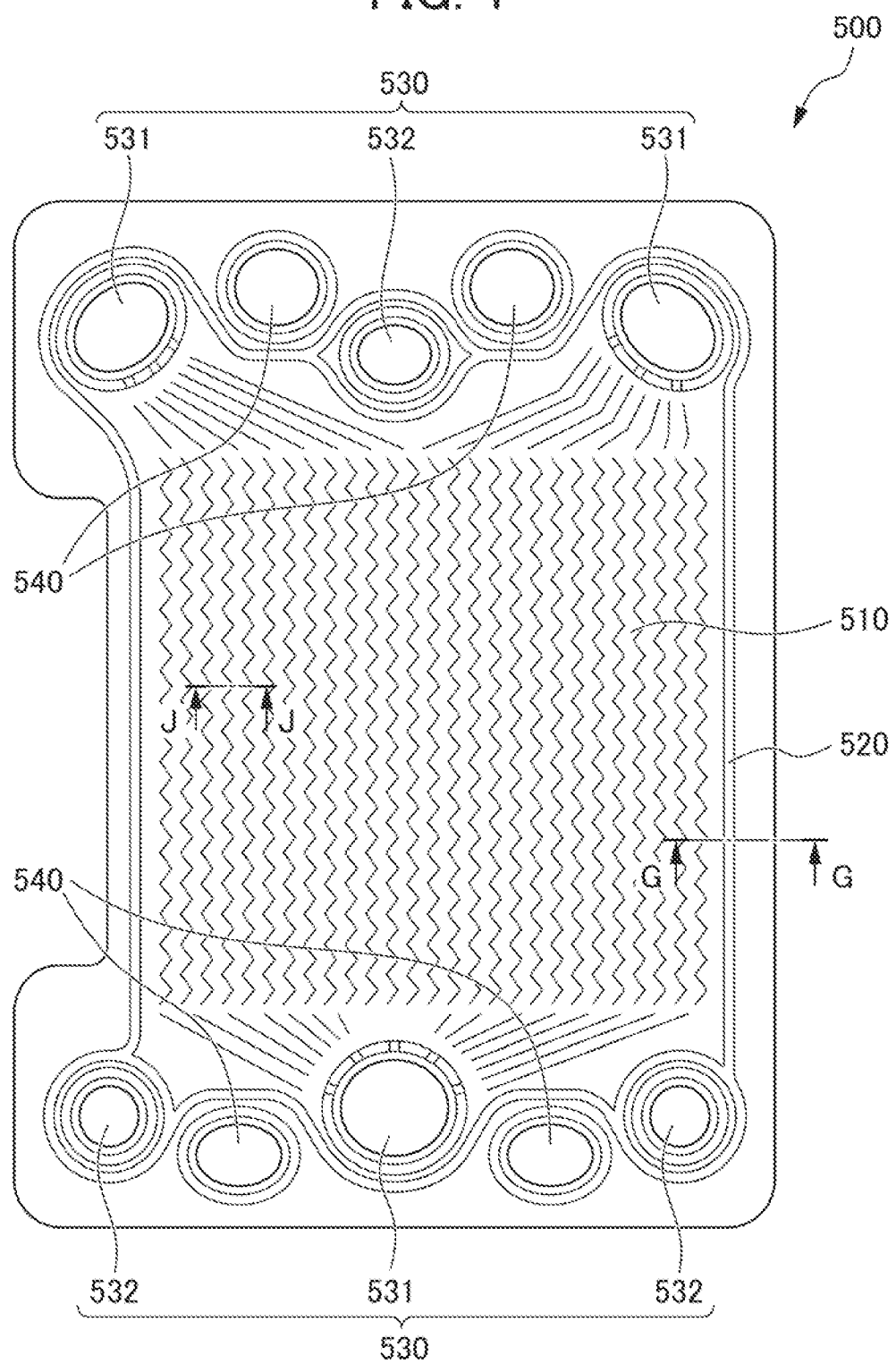
FIG. 1 is a view showing a fuel cell separator manufactured by a progressive pressing device of an embodiment.

Hereinafter, an embodiment of the present invention will be explained while referencing the drawings. FIG. 1 is a view showing a fuel cell separator 500 manufactured by the progressive pressing device 1 of the present embodiment (manufacturing apparatus 1 for fuel cell separators).

A power generation cell constituting the fuel cell is configured by a membrane electrode assembly being sandwiched by a pair of separators. Herein, an outline of the configuration of a separator will be explained using one separator 500 among the pair of separators.

The separator 500 has: a gas flow channel part 510 in which oxidant gas or fuel gas flows; a seal part 520 of convex shape for sealing the gas flow channel part 510 and a communication hole, which is pushed when superimposed with another separator to make a pair; a gas communication hole 530 through which oxidant gas or fuel gas passes; and a coolant communication hole 540 through which coolant passes. The gas communication hole 530 has a first gas communication hole 531 and a second gas communication hole 532, the first gas communication hole 531 having one gas among the oxidant gas or fuel gas pass therethrough, and the second gas communication hole 532 having the other gas among the oxidant gas or fuel gas pass therethrough. The first gas communication hole 531, second gas communication hole 532, and coolant communication hole 540 are generally called communication holes. It should be noted that the seal part may be provided to both or either one of the gas flow channel part or communication holes, so as to seal another portion thereof.

The separator 500 is configured from a metal plate such as a steel plate, stainless steel plate, aluminum steel plate, or titanium steel plate. Preferably, a stainless steel plate is used. The thickness of the metal plate constituting the separator 500 is thin, and is on the order of 0.1 mm, for example.

Figure 2:
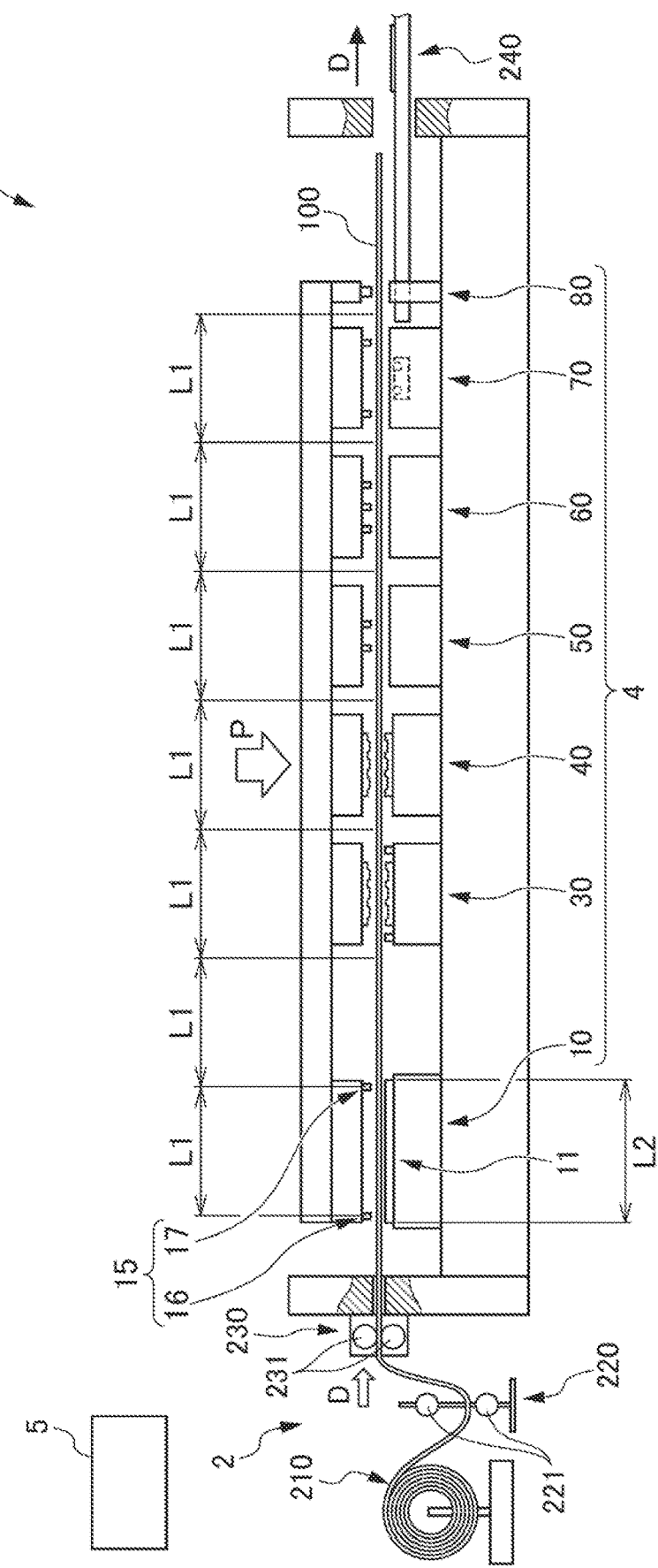
FIG. 2 is a view schematically showing a progressive pressing device of the present embodiment.
Figure 3:
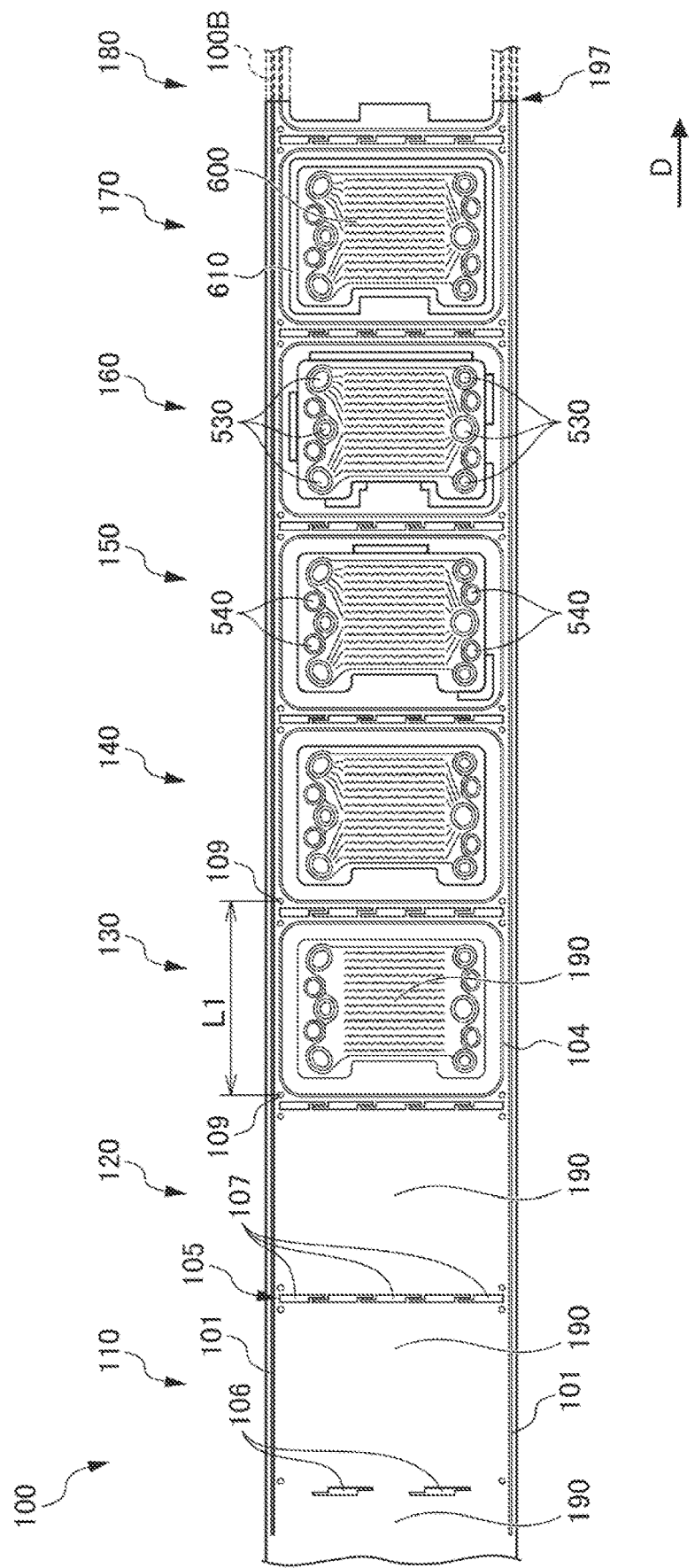
FIG. 3 is a view showing an elongated metal plate from which a plurality of separator shaped parts is formed by pressing with the progressive pressing device.

FIG. 2 is a view schematically showing the progressive pressing device 1 of the present embodiment. FIG. 3 is a view showing an elongated metal plate 100 of a stage at which a plurality of separator shaped parts 600 are formed as product parts by being pressed by the progressive pressing device 1 of the present embodiment. The progressive pressing device 1 of the present embodiment is a device for forming a separator shaped part 600 which is a shaped part of the fuel cell separator 500 in the elongated metal plate 100, and constitutes a fuel cell separator manufacturing apparatus.

As shown in FIG. 2, the progressive pressing device 1 (fuel cell separator manufacturing apparatus 1) includes: a conveying part 2, a lifting part 3 (omitted from illustration in FIG. 2), plurality of pressing parts 4, and a control part 5. The control part 5 controls the conveying part 2, lifting part 3, and plurality of pressing part 4.

The progressive pressing device 1 is a device which conveys elongated metal plates 100 by a first predetermined distance L1 (predetermined feed amount) by the conveying part 2, and performs a pressing process by a plurality of the pressing parts 4 arranged at intervals of the first predetermined distance L1. The elongated metal plate 100 is conveyed by a predetermined feed amount by the conveying part 2, the plurality of pressing parts 4 perform the pressing process at the same timing. By alternately and repeatedly performing conveying of the first predetermined distance L1 by the conveying part 2 and the pressing process by the plurality of pressing parts 4, the product part is formed in the elongated metal plate 100. As approaching the downstream side in the conveying direction D, the portion formed in the elongated metal plate 100 comes closer to the shape of the separator shaped part 600 as the completed product part.

The conveying part 2 conveys the elongated metal plate 100 by the predetermined feed amount in the longitudinal direction thereof. In the present embodiment, the predetermined feed amount is the first predetermined distance L1. Herein, the elongated metal plate 100 conveyed by the conveying part 2 is a metal plate which is the material of the separator 500, and is an elongated metal plate having a thickness on the order of 0.1 mm, and a width (distance in the short direction) on the order of 500 mm.

The conveying part 2 includes: an uncoiler 210, anti-deflection part 220, feeder 230, and discharging part 240.

The uncoiler 210 retains the elongated metal plate 100 in a coiled state to be withdrawable. The anti-deflection part 220 includes a pair of straightening rollers 221, and straightens deflection of the elongated metal plate 100. The feeder 230 includes a pair of feed rollers 231, and feeds the elongated metal plate 100 in a conveying direction D, by this pair of feed rollers 231 rotating. The discharging part 240 conveys the separator shaped part 600 (product part) cut loose from the elongated metal plate 100. Details of the discharging part 240 will be explained later.

The lifting part 3 is a mechanism for lifting up and lowering down the elongated metal plate 100 for making the conveyance of the elongated metal plate 100 and pressing process on the elongated metal plate 100 as smooth and appropriate. The configuration of the lifting part 3 and details of the operating contents will be explained later.

In order from the upstream side towards the downstream side in the conveying direction, the plurality of pressing parts 4 includes: a bead and slit molding part 10 (hereinafter also referred to as molding part 10), first pressing part 30 (serving as third bead molding part 30), second pressing part 40, first piercing part 50, second piercing part 60, trimming part 70, and scrap cutting part 80, as shown in FIG. 2. The length in the conveying direction of the pressing region by each pressing part is basically shorter than the first predetermined distance L1. However, only the length in the conveying direction of the pressing region of the molding part 10 is longer than the first predetermined distance L1. Each pressing part 4 on the downstream side in the conveying direction from the first pressing part 30 is arranged at a pitch of the first predetermined distance L1. However, the molding part 10 and first pressing part 30 are separated by the first predetermined distance L1, which is longer than the distance between for other pressing parts 4. In other words, the first pressing part 30 is arranged on the downstream side in the conveying direction from the molding part 10 by two pitch (twice of the first predetermined distance L1). Each pressing part 4 has a mold for performing a pressing process such as molding or punching. The plurality of pressing parts 4 perform pressing process at the same timing, basically. Consequently, it is possible to apply a load P using one load applying device, to the upper mold of a plurality and all of the pressing parts 4.

It should be noted that the portions indicated by reference numbers 110, 130, 140, 150, 160, 170, 180 shown in the elongated metal plate 100 of FIG. 3 are respectively portions of the elongated metal plate 100 after processed by the molding part 10, first pressing part 30 (third bead molding part 30), second pressing part 40, first piercing part 50, second piercing part 60, trimming part 70, scrap cutting part 80. As shown in FIG. 3, as approaching the downstream side in the conveying direction D, since the step of the pressing process executed by each pressing part 4 increases, the portion which was pressing processed nears the completed separator shaped part 600. The completed separator shaped part 600 is formed in the portion of reference number 170. It should be noted that the portion indicated by the reference number 120 is a portion conveyed by the feed amount of the first predetermined distance L1 by the conveying part 2, after processed by the molding part 10, and the pressing process is not carried out at this location.

The molding part 10 has a bead molding part 11 and slit forming part 15. The slit forming part 15 includes a first slit forming section 16 and a second slit forming section 17. The bead molding part 11, first slit forming section 16 and the second slit forming section 17 may be configured by an integral mold, or may be configured by separate molds, respectively. The bead molding part 11 molds a bead (bead 101A, bead 101B in time sequence in FIGS. 6A and 6B) having a length of a second predetermined distance L2 extending in the longitudinal direction of the elongated metal plate 100, in a side part of the region 190 which becomes the product part of the elongated metal plate 100. The second predetermined distance L2 is longer than the first predetermined distance L1. In other words, the second predetermined distance L2 is longer than the predetermined feed amount by the conveying part 2. The bead molding part 11 molds the continuously linked bead 101 by repeated operation. In the present embodiment, as shown in FIG. 3, the bead 101 is molded on both side parts of the region 190 which becomes the product part, at both sides in the short direction of the elongated metal plate 100 (both sides in width direction). The bead 101 is a molded part for improving the rigidity in the longitudinal direction of the elongated metal plate 100.

The first slit forming section 16 forms the first slit 106 (106A, 106B in time sequence in FIGS. 6A to 6C), which extends in the short direction of the elongated metal plate 100, to the upstream side in the conveying direction of the region 190 which becomes the product part of the elongated metal plate 100. In the present embodiment, the first slit forming section 16 forms two slits separated in the short direction of the elongated metal plate 100, as the first slit 106.

The second slit forming section 17 forms the second slit 107 (107A, 107B in time sequence in FIGS. 6A and 6B), which extends in the short direction of the elongated metal plate 100 to the downstream side in the conveying direction of the region 190 which becomes the product part of the elongated metal plate 100. In the present embodiment, the second slit forming section 17 forms three slits separated in the short direction of the elongated metal plate 100, as the second slit 107. The second slit forming section 17 is arranged at a position separated by the first predetermined distance L1, to the downstream side in the conveying direction of the first slit forming section 16. In other words, the position of the mold of the first slit forming section 16 which forms the first slit 106, and the position of the mold of the second slit forming section 17 which forms the second slit 107 are separated by the same distance as the predetermined feed amount of the conveying part 2. The slit 105 extending in the short direction of the elongated metal plate 100 is formed by the first slit 106 formed by the first slit forming section 16, and the second slit 107 formed by the second slit forming section 17 after the elongated metal plate 100 is conveyed by the first predetermined distance L1.

The first pressing part 30 press molds so that a region to become the gas flow channel part 510 of the separator 500 becomes the first gas flow channel shape 511, and press molds so that the region to become the seal part 520 of convex shape for sealing the gas flow channel part and communication hole becomes the first seal part shape 521.

It should be noted that the first pressing part 30 also functions as a third bead molding part in the present embodiment. Consequently, the first pressing part 30 is also referred as a third bead molding part 30. The third bead molding part 30 molds the third bead 104 of a shape surrounding the periphery of the region 190 which becomes the product part, and is surrounded by the bead 101 and slit 105 in the elongated metal plate 100.

In this way, the first pressing part 30 (third bead molding part 30) is arranged on the downstream side in the conveying direction of the molding part 10, and simultaneously executes press molding of the region 190 which becomes the product part, and press molding of the third bead 104 surrounding the periphery of the region 190 which becomes the product part. The first pressing part 30 press molds so as to mold the first gas flow channel shape 511 and first seal part shape 521 in the region 190 which becomes the product part.

The second pressing part 40 press molds so that the first gas flow channel shape 511 molded by the first pressing part 30 becomes the second gas flow channel shape 512, and press molds so that the first seal part shape 521 formed by the first pressing part 30 becomes the second seal part shape 522.

The first piercing part 50 punches out a part of the holes among the portion which becomes the hole part of the separator 500. Herein, the portions which become four coolant communication holes 540 are punched.

The second piercing part 60 punches the remaining holes which had not been punched by the first piercing part 50, among the portions which become the hole part of the separator 500. Herein, the portions which become six gas communication holes 530 are punched.

The trimming part 70 cuts loose the separator shaped part 600 from the elongated metal plate 100, by punching the outer peripheral part 610 of the separator shaped part 600 formed in the elongated metal plate 100.

The scrap cutting part 80 cuts the portion 100B which becomes scrap of the elongated metal plate 100, after the separator shaped part 600 is cut loose.

Next, the details of the progressive pressing method of the present embodiment will be explained. Herein, the progressive pressing method of the present embodiment is used as the method of manufacturing the fuel cell separator 500, and constitutes the manufacturing method for fuel cell separators.

FIG. 4 is a flowchart showing a process executed by each pressing part 4 on the region 190 which becomes one product part, while the region 190 which becomes one product part is conveyed in predetermined feed amounts by the conveying part 2. First, in a first step S1, the molding part 10 executes a bead and slit forming process. The second step S2 is a pass-through step in which the pressing process is not particularly performed. In the third step S3, the first pressing part 30 (third bead molding part 30) executes the third bead molding step and the first pressing step on the region 190 to become the product part. In the fourth step S4, the second pressing part 40 executes the second pressing step on the region 190 to become the product part. In the fifth step S5, the first piercing part 50 executes the first piercing step of punching a part of the hole part. In the sixth step, the second piercing part 60 executes a second piercing step of punching the remaining holes. In the seventh step S7, the trimming part 70 executes a trimming step of punching the outer peripheral part of the separator shaped part 600. In the eighth step S8, the scrap cutting part 80 executes the scrap cutting step of cutting a portion which becomes scrap of the elongated metal plate 100.

These steps are executed simultaneously on the regions 190 which become a plurality of product parts. However, when trying to focus on the region which becomes one product part (for example, region 191 which becomes a first product part described later), the pressing process is sequentially executed by the first step S1 to eighth step S8, while conveying by the conveying part 2, in this region.

Hereinafter, a part of the steps will be explained in detail while summarizing.

(Bead and Slit Forming Step S10)

The bead and slit forming step S10 will be explained using FIGS. 5 to 8. This step is a step executed over the aforementioned first step S1 to third step S3. Hereinafter, among the regions 190 which become the product parts of the elongated metal plate 100, it will be explained focusing on the region 191 becoming the first product part and the region 192 becoming the second product part. In this bead and slit forming step S10, the molding part 10 and first pressing part 30 (third bead molding part 30) are used as a pressing part 4.

FIG. 5 shows a flowchart of the bead and slit forming step S10. The bead and slit forming step S10 includes a first bead molding step S11, first conveying step S12, and second bead molding step S13. In addition, the bead and slit forming step includes the first slit forming step S11 which is performed simultaneously with the first bead molding step S11, and the second slit forming step S13 which is performed simultaneously with the second bead molding step S13. Furthermore, the bead and slit forming step includes a second conveying step S14 and third bead molding step S15, which are executed after the second bead molding step S13 and second slit forming step S13.

Figure 6A:
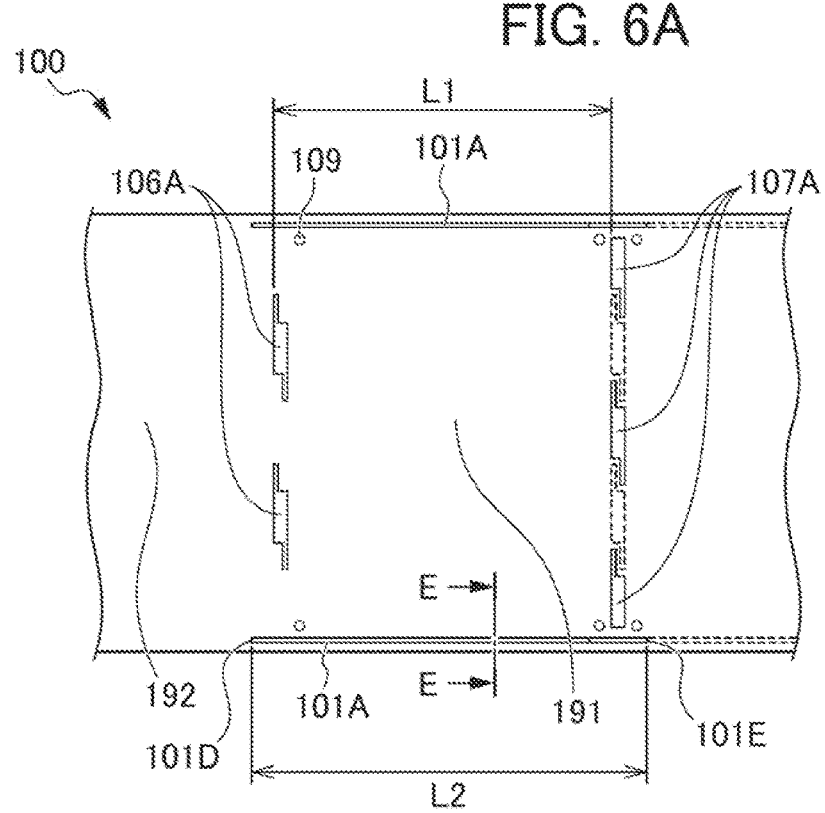
FIG. 6A shows a state of an elongated metal plate molded by a first bead molding step.
Figure 6B:
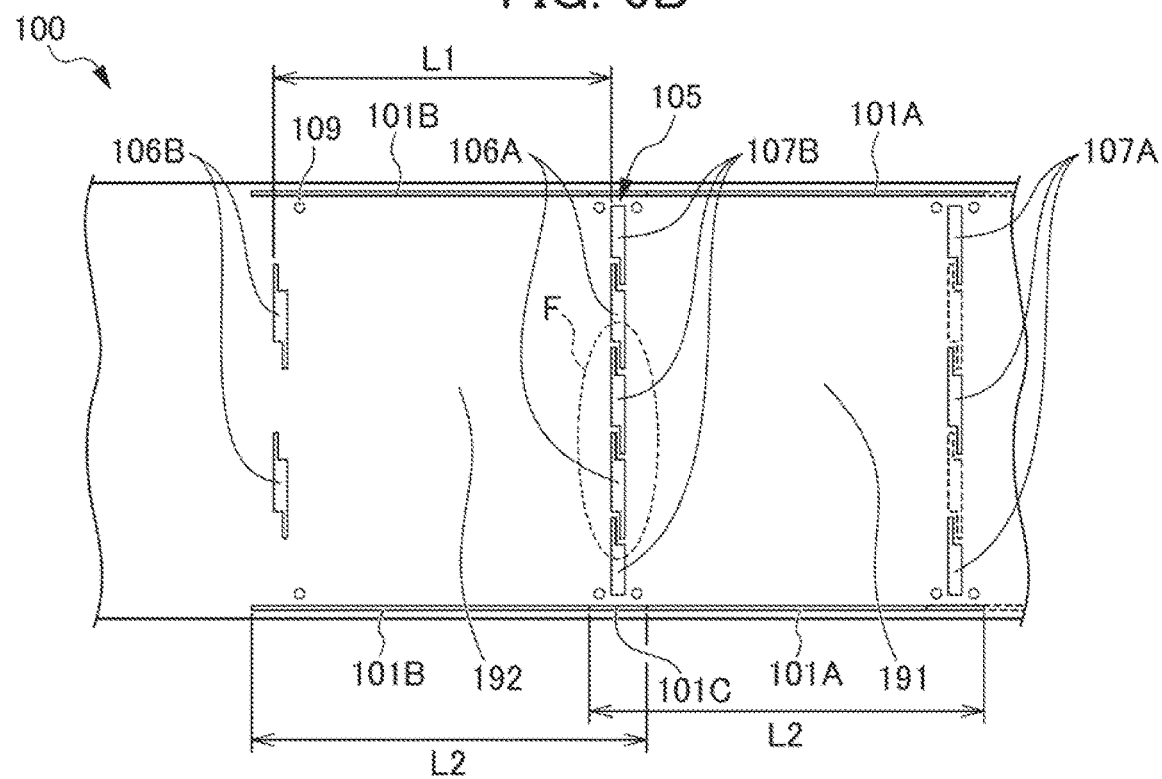
FIG. 6B is a view showing a state of an elongated metal plate molded by a second bead molding step.

FIG. 6A is a view showing a state of the elongated metal plate 100 in which the first bead 101A, first slit 106A and second slit 107A were molded by the molding part 10, in the first bead molding step S11 and first slit forming step S11. FIG. 6B is a subsequent view showing a state of the elongated metal plate 100, in which the second bead 101B, first slit 106B and second slit 107B were molded by the molding part 10 in the second bead molding step S13 and second slit forming step S13, after conveying the elongated metal plate 100 in the longitudinal direction by the feed amount of the first predetermined distance L1. FIG. 6C is a view showing a state of the elongated metal plate 100 in which the third bead 104 was molded by the third bead molding part 30 in the third bead molding step S15, after conveying the elongated metal plate 100 in the longitudinal direction by the feed amount of the first predetermined distance L1. It should be noted that, in FIGS. 6A to 6C, the bead and slit formed in steps before the first bead molding step S11 (first slit forming step S11) are shown by dotted lines.

First, an explanation will be provided by focusing on the bead molding step. First, in the first bead molding step S11, the bead molding part 11 molds the first bead 101A having the length of the second predetermined distance L2 extending in the longitudinal direction of the elongated metal plate 100, at the side part of the region 191 which becomes the first product part of the elongated metal plate 100. It should be noted that this step corresponds to a step executing the aforementioned first step S1, with the region 191 to become the first product part as the target.

The state of the elongated metal plate 100 at this time is shown in FIG. 6A. Herein, the second predetermined distance L2 is longer than the first predetermined distance L1. In other words, the second predetermined distance L2 is longer than the predetermined feed amount by the conveying part 2.

Next, in the first conveying step S12, the conveying part 2 conveys the elongated metal plate 100 by the feed amount of the first predetermined distance L1 in the longitudinal direction.

Next, in the second bead molding step S13, the bead molding part 11 molds the second bead 101B having the length of the second predetermined distance L2 extending in the longitudinal direction of the elongated metal plate 100, so as to link with the first bead 101A molded in the first bead molding step S11, at the side part of the region 192 to become the second product part of the elongated metal plate 100. It should be noted that this step corresponds to a step executing the aforementioned first step S1, with the region 192 to become the second product part as the target.

The state of the elongated metal plate 100 at this time is shown in FIG. 6B. Herein, since the second predetermined distance L2 is longer than the first predetermined distance L1, which is the predetermined feed amount by the conveying part 2, the position at which the first bead 101A is molded and the position at which the second bead 101B is molded have the overlap 101C.

Subsequently, since the conveying and bead molding are repeatedly executed similarly, the bead 101 which is continuously linked without gaps is formed.

In this way, since the second predetermined distance L2 which is the length of the first bead 101A and second bead 101B is longer than the first predetermined distance L1 which is the feed amount by the conveying part 2, it is possible to continuously mold, in an efficient step, the bead 101 as a molded part for raising the rigidity of the elongated metal plate. In addition, by performing such a process, it is possible to achieve reinforcement of the elongated metal plate 100 during progressive feeding, and suppress the occurrence of deflection of the elongated metal plate 100 during the pressing process.

FIG. 7 shows a cross-sectional view along the line E-E in FIG. 6A. The shape of the bead 101 is preferably a convex shape in a cross section such as that shown in FIG. 7, from the viewpoint of securing rigidity and processability. The bead molding part 11 has a mold for molding the bead 101 of such a convex shape in the cross section. However, so long as the shape of the bead 101 is a configuration raising the rigidity in the longitudinal direction of the elongated metal plate 100, the shape thereof is not a problem.

It should be noted that, in the bead and slit forming step S10 of the present embodiment, the first slit forming step S11 is performed simultaneously with the first bead molding step S11. In addition, the second slit forming step S13 is performed simultaneously with the second bead molding step S13.

An explanation will thereby be provided focusing on the slit forming step. First, in the first slit forming step S11, the first slit forming section 16 forms the first slit 106A, on an upstream side in the conveying direction of the region 191 which becomes the first product part of the elongated metal plate 100 (between the region 191 to become the first product part and the region 192 to become the second product part). In addition, the second slit forming section 17 forms the second slit 107A on the downstream side in the conveying direction of the region 191 to become the first product part of the elongated metal plate 100. It should be noted that this step corresponds to a step executing the aforementioned first step S1, with the region 191 to become the first product part as the target. The state of the elongated metal plate 100 at this time is shown in FIG. 6A.

Next, in the first conveying step S12, the conveying part 2 conveys the elongated metal plate 100 by the feed amount of the first predetermined distance L1 in the longitudinal direction. The first slit 106A on the upstream side in the conveying direction of the region 191 to become the first product part comes to a position overlapped in the longitudinal direction with a position at which the second slit 107 is formed by the second slit forming section 17.

Next, in the second slit forming step S13, the first slit forming section 16 forms the first slit 106B on an upstream side in the conveying direction of the region 192 to become the second product part of the elongated metal plate 100. In addition, the second slit forming section 17 forms the second slit 107B at the downstream side in the conveying direction of the second product part of the elongated metal plate 100, i.e. upstream side in the conveying direction of the region 191 to become the first product part (between the region 191 to become the first product part and the region 192 to become the second product part). It should be noted that this step corresponds to a step executing the aforementioned first step S1 with the region 192 to become the second product part as the target. The state of the elongated metal plate 100 at this time is shown in FIG. 6B.

In this way, the slit 105 arranged between the region 191 to become the first product part and the region 192 to become the second product part is formed by a combination of the first slit 106A formed by the first slit forming step S11, and the second slit 107B formed by the second slit forming step S13. Herein, the first slit 106A and second slit 107B are formed to be lined up with a gap in the short direction of the elongated metal plate 100. In addition, the first slit 106A and second slit 107B are formed at positions not overlapping.

Subsequently, since conveying and slit forming are similarly executed repeatedly, the slit 105 extending in the short direction of the elongated metal plate 100 is sequentially formed in a region between regions 190 which become adjoining product parts.

It thereby becomes possible to effectively absorb the stress generated in the elongated metal plate 100 during the pressing process by each pressing part 4 thereafter. In addition, by providing the slit 105 in a region between regions 190 which become adjoining product parts, the regions 190 to become the product parts will hardly receive the influence of other pressing processes conducted on the upstream side or downstream side in the conveying direction thereof. In particular, since the slits 105 are lined up with a gap in the short direction of the elongated metal plate 100, the effect thereof is great. Moreover, in addition to molding the bead 101 continuously at both ends of the region 190 to become the product part of the elongated metal plate 100, by forming the slit 105 in a region between regions 190 to become adjacent product parts of the elongated metal plate 100, which is the inner side in the short direction of the overlap 101C of the first bead 101A and second bead 101B of the bead 101 on both side parts thereof, it is possible to synergistically improve the effect of suppressing deflection occurring in the region 190 to become the product part, during the pressing process. It should be noted that, due to establishing as a step which does not at one time punch the first slit 106 and second slit 107 lined up in a row in the short direction, problems such as the elongated metal plate 100 deflecting hardly arise. In addition, due to simultaneously performing the bead molding step and slit forming step, it is possible to achieve shortening of the processing time. In addition, since the bead molding part 11, first slit forming section 16 and second slit forming section 17 are configured by one molding part 10, it is possible to prevent a size increase of the apparatus. Consequently, it leads to a reduction in the footprint of the apparatus.

Figure 8:
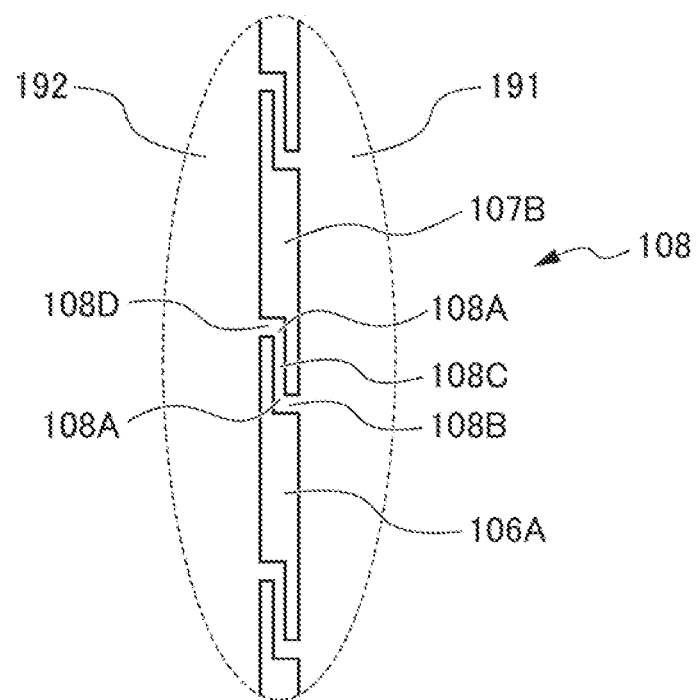
FIG. 8 is an enlarged view of a part F in FIG. 6B.

FIG. 8 is an enlarged view of part F in FIG. 6B. As shown in FIG. 8, a remainder 108 of the elongated metal plate 100 existing between the first slit 106 and second slit 107 has a curved part 108A. In more detail, the remainder 108 has a first withdrawn part 108B which connects with the region 191 to become the first product part, and extends towards the upstream side in the conveying direction; an intermediate part 108C having one end side connected with the upstream side in the conveying direction of the first withdrawn part 108B, and extending in the short direction; and a second withdrawn part 108B which connects with the other end side of the intermediate part 108C, and extends towards the upstream side in the conveying direction to connect with the region 192 which becomes the second product part. The one end side and other end side of the intermediate part 108C become the curved part 108A.

If such a configuration, the curved part 108A becomes able to more effectively absorb stress generated in the elongated metal plate 100, during the pressing process by each pressing part 4 thereafter. However, the shapes of the first slit 106 and second slit 107 are not limited thereto, and may be a rectangular shape, for example.

Next, in the second conveying step S14, the conveying part 2 conveys the elongated metal plate 100 in the longitudinal direction by the feed amount of the first predetermined distance L1, which is shorter than the second predetermined distance L2.

Next, in the third bead molding step S15, the third bead molding part 30 molds, in the elongated metal plate 100, the third bead 104 of a shape surrounding the periphery of the region 191 which becomes the first product part, and is surrounded by the bead 101 and slit 105. It should be noted that this step corresponds to a step executing the aforementioned third step S3 with the region 191 to become the first product part as the target.

The state of the elongated metal plate 100 at this time is shown in FIG. 6C. It should be noted that FIG. 6C shows the second slit 107A which was simultaneously formed with the first forming step S11, and the first slit 106Z which was formed in a step before the first slit forming step S11. Herein, part of the slit 105 (second slit 107A) formed on the downstream side in the conveying direction of the region 191 to become the first product part is a part formed simultaneously with the first bead molding step S11 (first slit forming step S11).

In this way, in addition to molding the bead 101 continuously at both ends of the region 190 to become the product part of the elongated metal plate 100, by forming the slit 105 in a region between regions 190 to become adjacent product parts of the elongated metal plate 100, and further molding the annular third bead 104 of a shape surrounding the periphery of the region 190 to become the product part, and surrounded by the bead 101 and slit 105, it is possible to more synergistically improve the effect of suppressing deflection occurring in the region 190 to become the product part, during the pressing process. Then, the region 190 to become the product part is less susceptible in other pressing processes conducted on the upstream side or downstream side in the conveying direction thereof. It should be noted that the cross-sectional shape of the third bead 104 may be made a cross-sectional convex shape such as that shown in FIG. 7, similarly to the cross-sectional shape of the bead 101.

In addition, by using each pressing part 4 distributedly or jointly as mentioned above, and further executing distributedly or simultaneously in chronology the first bead molding step S11, second bead molding step S13, third bead molding step S15, first slit forming step S11 and second slit forming step S13, it is possible to achieve shortening of the processing time, a reduction in apparatus size, while obtaining an effect of effectively suppressing deflection occurring in the region 190 to become the product part.

It should be noted that, in the present embodiment, as shown in FIG. 6A, the position of the conveying direction upstream-side end 101D of the first bead 101A formed by the bead molding part 11 comes to be more on the upstream side in the conveying direction than the position of the first slit 106A formed by the first slit forming section 16. In addition, the position of the conveying direction downstream-side end 101E of the first bead 101A formed by the bead molding part 11 comes to be more on the downstream side in the conveying direction than the position of the second slit 107A formed by the second slit forming section 17. It is thereby possible to perform the pressing process by the molding part 10 with balance.

It should be noted that, in the third bead molding step S15, the first pressing step which is a first stage of the pressing process among a two-stage pressing process described later is executed on the region 190 to become the product part, simultaneously with the press molding of the third bead 104 surrounding the periphery of the region 190 to become the product part. It is thereby possible to achieve shortening of the process time and a reduction in apparatus size, while obtaining an effect of suppressing deflection occurring the region 190 to become the product part.

It should be noted that the molding part 10 may form a positioning hole 109 by a pressing process, simultaneously with the bead and slit. In the present embodiment, four positioning holes 109 are formed by the molding part 10 in the four corners. By this positioning hole 109 being formed, the elongated metal plate 100 after conveying is positioned at an accurate position, during the pressing process in a step on the downstream side in the conveying direction after this.
(Pressing Step S20)

The pressing step S20 will be explained using FIGS. 9 to 13. In the pressing step S20, a two-stage pressing process is performed on the region 190 which becomes the product part of the elongated metal plate 100. The pressing step S20 includes the aforementioned third step S3 and fourth step S4. In this pressing step S20, the first pressing part 30 and second pressing part 40 can be used as the pressing parts 4.

Figure 9:
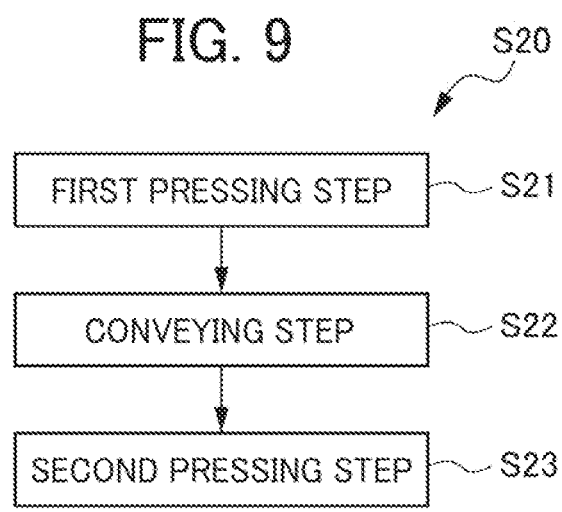
FIG. 9 is a flowchart of a pressing step of the present embodiment.

FIG. 9 shows a flowchart of the pressing step S20. The pressing step S20 includes a first pressing step S21, conveying step S22 and second pressing step S23.

First, in the first pressing step S21, the first pressing part 30 executes the first pressing step on the region 190 to become the product part. This step is a first stage of the pressing step, and corresponds to the aforementioned third step S3. In more detail, in the first pressing step S21, the first pressing part 30 press molds so that the region to become the gas flow channel part 510 of the separator 500 becomes a first gas flow channel shape 511, and press molds so that a region to become a seal part 520 of convex shape for sealing the gas flow channel part and communication hole becomes a first seal part shape 521. In addition, the first pressing step simultaneously performs the aforementioned third bead molding step, and press molds the third bead into the third bead shape.

Next, in the conveying step S22, the conveying part 2 conveys the elongated metal plate 100 by the feed amount which is the first predetermined distance L1 in the longitudinal direction.

Next, in the second pressing step S23, the second pressing part 40 executes the second pressing step on the region 190 to become the product part. This step is a second stage of the pressing step, and corresponds to the aforementioned fourth step S4. In more detail, in the second pressing step S23, the second pressing part 40 press molds so that the first gas flow channel shape 511 molded by the first pressing part 30 becomes the second gas flow channel shape 512, and press molds so that the first seal part shape 521 molded by the first pressing part 30 becomes the second seal part shape 522.

Herein, an explanation is provided hereinafter focusing on the two-stage pressing process performed on the region that becomes the seal part 520 (refer to FIG. 1) of the separator 500. It should be noted that the seal part 520 of the separator 500 is a portion which is pushed when superimposed with another separator to make a pair. Consequently, this portion requires higher strength compared to other molded parts such as the gas flow channel part 510.

Figure 10:
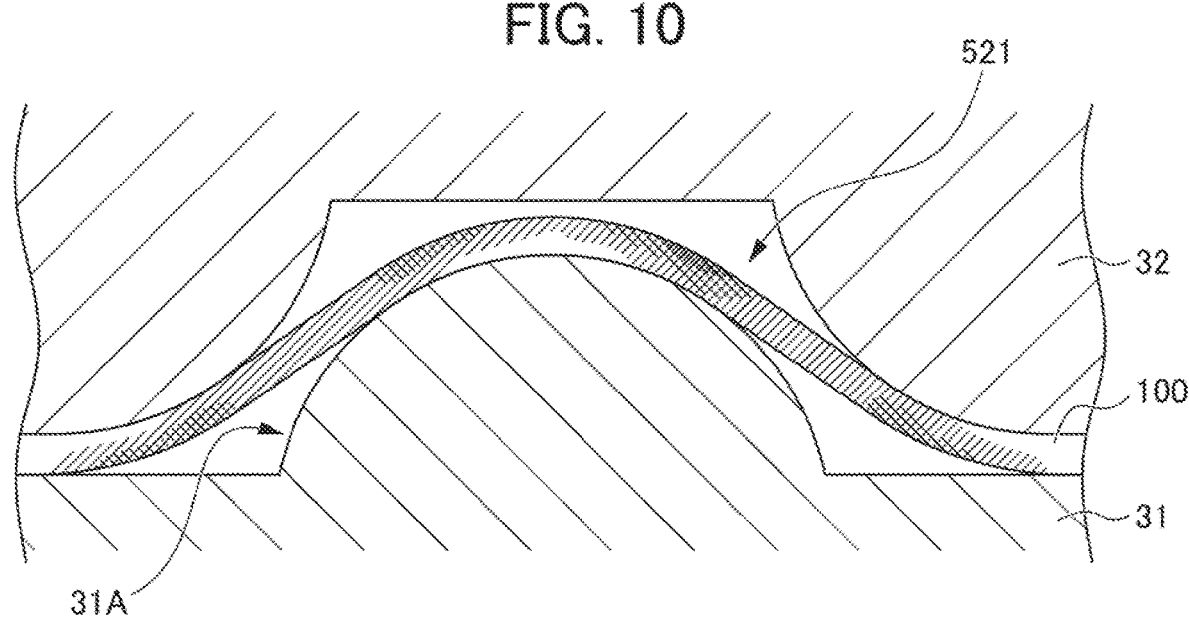
FIG. 10 is a view showing the cross-sectional shape after a first pressing step, in a region which becomes a seal part of the separator.

In the first pressing step S21, the first pressing part 30 press molds so that the region to become the seal part 520 becomes the first seal part shape 521. By this first pressing step S21, work hardening is imparted to the entire region that becomes a convex shape configuring the seal part 520. FIG. 10 is a cross-sectional view in the middle of processing corresponding to a cross section along the line G-G of the seal part 520 of the separator 500 shown in FIG. 1, and is a cross-sectional view showing the cross-sectional shape (first seal part shape 521) after the first processing step S21. FIG. 10 shows the shapes of the lower mold 31 and upper mold 32 of the first pressing part 30, relative to the region which becomes the seal part 520. In addition, FIG. 10 shows by way of hatching the distribution of distortion in the first seal part shape 521 obtained by simulation.

Figure 11:
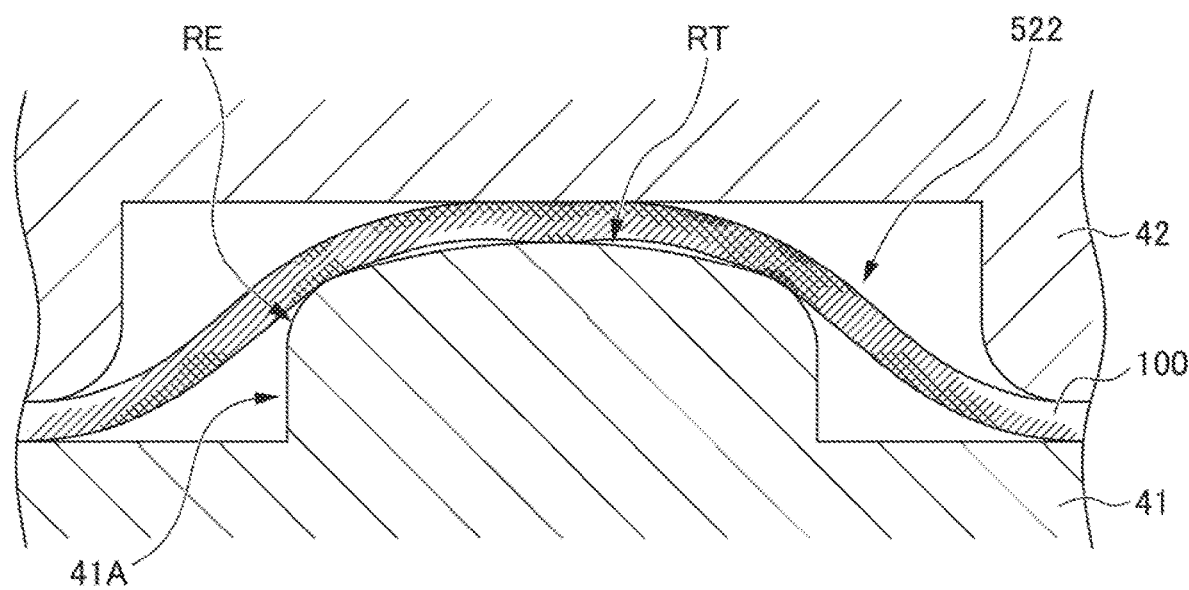
FIG. 11 is a view showing the cross-sectional shape after the second pressing step, in a region which becomes the seal part of the separator.

In the second pressing step S23, the second pressing part 40 press molds the region work hardened in the first pressing step S21 so as to become a convex shape corresponding to the final seal part 520. FIG. 11 is a cross-sectional view corresponding to a cross section along the line G-G of the seal part 520 of the separator 500 shown in FIG. 1, and is a cross-sectional view showing the cross-sectional shape (second seal part shape 522) after the second pressing step S23. FIG. 11 shows the shapes of the lower mold 41 and upper mold 42 of the second pressing part 40, relative to the region which becomes the seal part 520. In addition, FIG. 11 shows by way of hatching the distribution of distortion in the second seal part shape 522 obtained by simulation.

Figure 12:
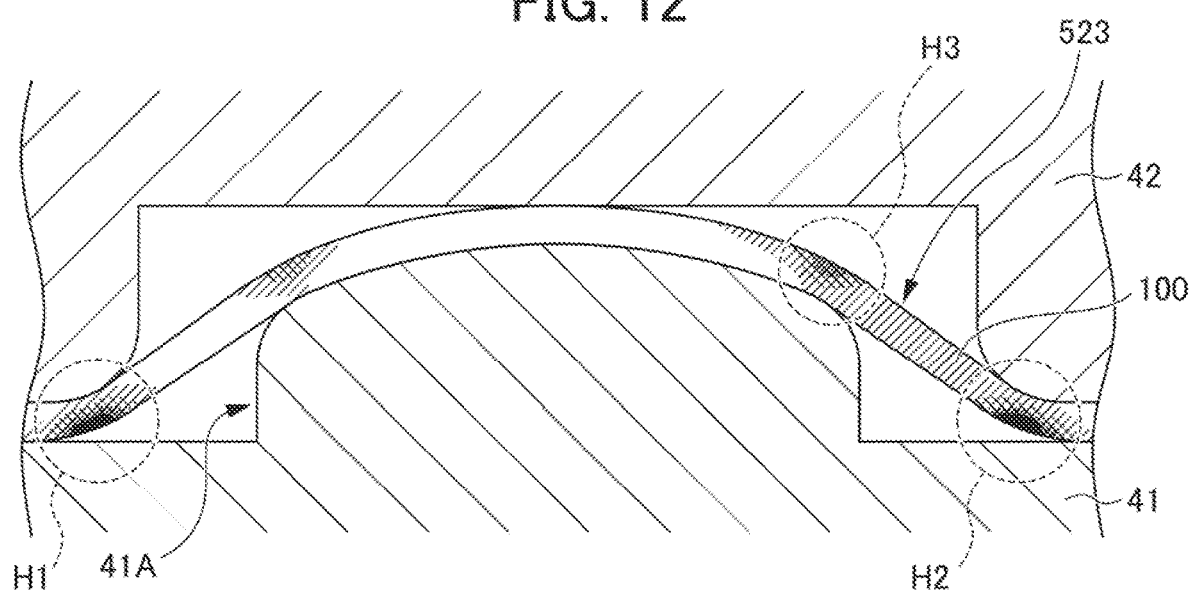
FIG. 12 is a view showing a comparative example, and shows a cross-sectional shape of a portion thereof, in a case of forming the shape of the final seal part by only one pressing step.

FIG. 12 is a view showing a comparative example, and is a cross-sectional view showing, in the case of forming the shape of the final seal part 520 by only one time pressing step, the cross-sectional shape (seal part shape 523) of this portion. FIG. 12 shows the shapes of the lower mold 41 and upper mold 42 of the pressing part in the comparative example. This is the same as the shapes of the lower mold 41 and upper mold 42 shown in FIG. 11. In addition, FIG. 12 shows by way of hatching the distribution of distortion in the seal part shape 523 obtained by simulation. Herein, portions with higher the density of lines in the hatching have greater distortion.

As shown in FIG. 12, in the comparative example, the distribution of distortion in the seal part shape 523 is not uniform, and portions of locally high distortion H1, H2, H3 exist. Although these portions are work hardened, the plate thickness is thin, and the overall strength is low. In other words, in this comparative example, the plate thickness of the seal part shape 523 after the press molding becomes non-uniform, and uniform work hardening is not imparted to the seal part shape 523.

On the other hand, the present embodiment includes: the first pressing step S21 imparting the work hardening to the entire region which becomes a convex shape configuring the seal part 520, and the second pressing step S23 which press molds the region work hardened in the first pressing step so as to become a convex shape. In this way, since work hardening is imparted to the entire region which becomes a convex shape configuring the seal part 520 in the first pressing step S21, it is possible to raise the strength of the completed seal part 520.

In addition, in the present embodiment, since conducting the pressing process with the object of imparting work hardening to the entire region which becomes the convex shape configuring the seal part 520 in the first pressing step S21, the uniformity of the distribution of distortion of the first seal part shape 521 after the first pressing step S21 is high as shown in FIG. 10. In addition, the uniformity in plate thickness of the first seal part shape 521 after the first pressing step S21 is high.

Then, in the first pressing step S21, since work hardening is imparted to the entire region which becomes a convex shape configuring the seal part 520, the uniformity of the distribution of distortion in the second seal part shape 522 after the second pressing step S23 is high as shown in FIG. 11. In addition, the uniformity in plate thickness of the second seal part shape 522 after the second pressing step S23 is high.

It should be noted that, in the first pressing step S21, press molding is conducted so that the upper surface of the first seal part shape 521 becomes a circular arc shape which is convex upwards. In the first pressing step S21, the lower mold 31 having the portion 31A of convex type which is substantially semicircular in the cross section such as that shown in FIG. 10 is used. By configuring in this way, in the first pressing step S21, press molding is conducted so that work hardening is imparted mostly uniformly to the upper surface of the first seal part shape.

On the other hand, in the second pressing step S23, the lower mold 41 having the portion 41A of a continuous shape in a circular arc which is convex upwards such as that shown in FIG. 11 is used. The circular arc shape of the upper surface of the lower mold 31 in the first pressing step S21 has a radius of 0.5 mm to 2.0 mm. The circular arc shape of the upper surface RT of the lower mold 41 in the second pressing step S23 is a radius of 0.5 mm to 10.0 mm, the length in the width direction thereof is 1.0 mm to 2.0 mm, and is longer in the width direction than the lower mold 31 in the first pressing step S21. In addition, the radius of both corners RE of the lower mold 41 in the second pressing step S23 is 0.1 mm to 0.5 mm. The dimensions of these molds can be set as appropriate.

It should be noted that, in the first pressing step S21 and second pressing step S23, two-stage pressing is performed on the region which becomes the gas flow channel part 510 (refer to FIG. 1) of the separator 500. In other words, as mentioned earlier, in the first pressing step S21, the first pressing part 30 press molds so that the region which becomes the gas flow channel part 510 of the separator 500 becomes the first gas flow channel shape 511. In the second pressing step S23, the second pressing part 40 press molds so that the first gas flow channel shape 511 molded by the first pressing part 30 becomes the second gas flow channel shape 512.

Figure 13A:
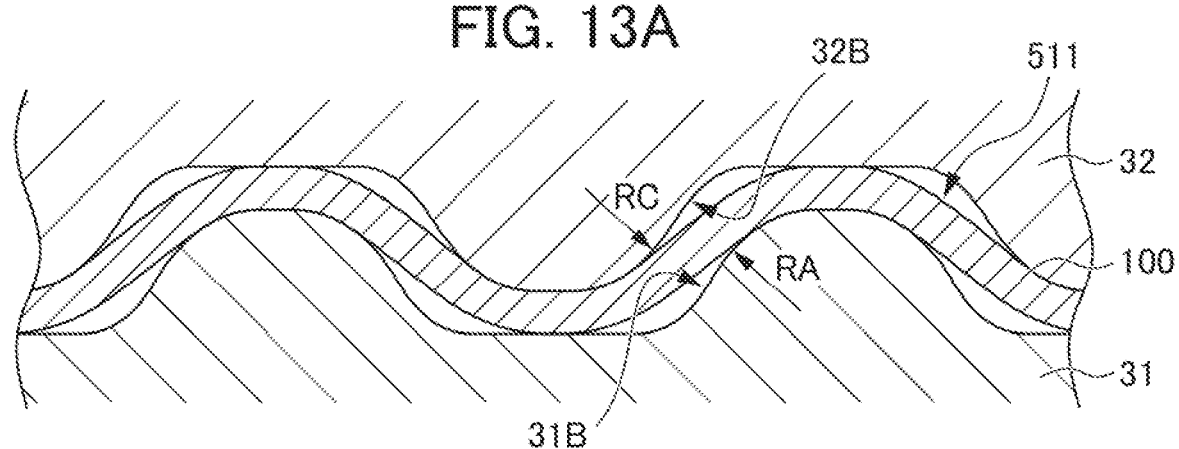
FIG. 13A is a view showing a first gas flow channel shape after the first pressing step.
Figure 13B:
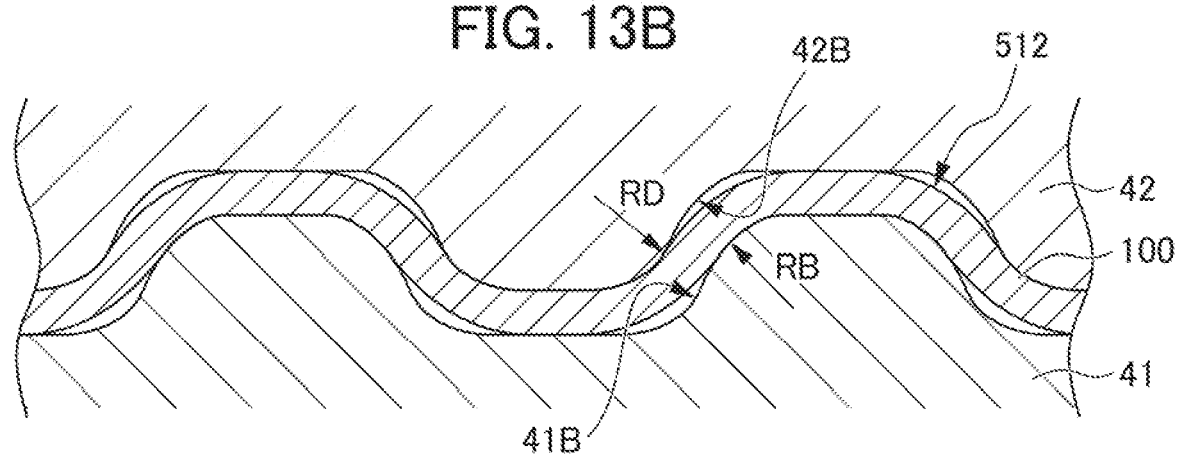
FIG. 13B is a view showing a second gas flow channel shape after the second pressing step.
Figure 13C:
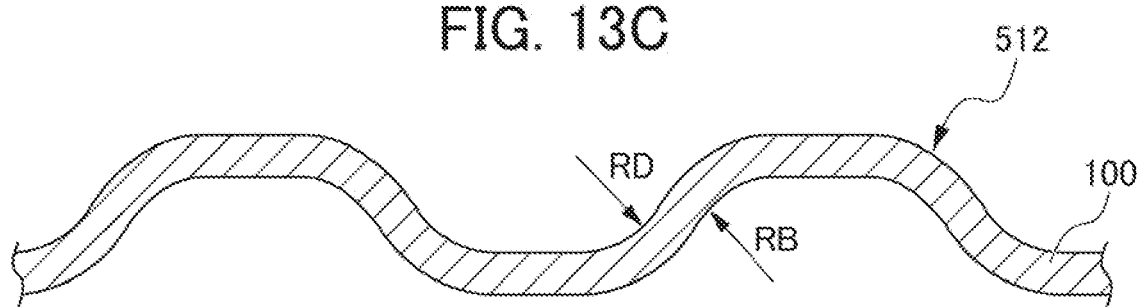
FIG. 13C is a view showing a second gas flow channel shape after the second pressing step.

FIG. 13A is a cross-sectional view in the middle of processing corresponding to the cross section along the line J-J of the gas flow channel part 510 of the separator 500 shown in FIG. 1, and is a cross-sectional view showing the cross-sectional shape (first gas flow channel shape 511) after the first pressing step S21. In addition, FIG. 13A shows the shapes of the lower mold 31 and upper mold 32 of the first pressing part 30, relative to the region which becomes the gas flow channel part 510, used in the first pressing step S21. FIG. 13B is a cross-sectional view corresponding to a cross section along the line J-J of the gas flow channel part 510 of the separator 500 shown in FIG. 1, and is a cross-sectional view showing the cross-sectional shape (first gas flow channel shape 511) after the first pressing step S21. In addition, FIG. 13B shows the shapes of the lower mold 41 and upper mold 42 of the second pressing part 40, relative to the region which becomes the gas flow channel part 510, used in the second pressing step S23. FIG. 13C is a view of the second gas flow channel shape 512 after the second pressing step S23, which is after removing the molds. The gas flow channel part 510 does not require high strength like that of the seal part 520. Consequently, upon molding the first gas flow channel shape 511, imparting uniform work hardening is not an object.

As shown in FIG. 13A and FIG. 13B, the radius RA of the convex part 31B of the lower mold 31 used in the first pressing step S21 is larger than the radius RB of the convex part 41B of the lower mold 41 used in the second pressing step. In addition, the radius RC of the concave part 32B of the upper mold 32 used in the first pressing step S21 is larger than the radius RD of the concave part 42B of the upper mold 42 used in the second pressing step. It thereby becomes possible to suppress shape return of the metal plate after press molding, and it is possible to suppress the occurrence of unintended waviness of the second gas flow channel shape 512. On the other hand, upon molding the first gas flow channel shape 511, imparting uniform work hardening is not an object.

As mentioned above, the gas flow channel part 510 does not require high strength like that of the seal part 520. Consequently, in the first pressing step S21, press molding is performed so that work hardening is imparted more uniformly to the region press molded into the first seal part shape 521 than the region press molded into the first gas flow channel shape 511. In addition, in the first pressing step S21, press molding is performed so that the uniformity of the plate thickness of the region press molded into the first seal part shape 521 is higher than the uniformity of the plate thickness of the region press molded into the first gas flow channel shape 511.

In addition, in the first pressing step, the third bead is press molded into the third bead shape before press molding the first seal part shape 521 and first gas flow channel shape 511, by a first lock bead molding mold (not illustrated) formed in the upper mold 32 and lower mold 31. The first seal part shape and first gas flow channel shape 511 are press molded in a state pulling the metal plate material of a region which becomes the product part in the outer circumferential direction by the third bead; therefore, it is possible to mold the first product part shape precisely. Such a lock bead molding mold may also be provided in the second pressing step.

In this way, in the present embodiment, a two-stage pressing process is employed on the region to become the seal part 520 of the separator 500, and work hardening is imparted to the entire region which becomes a convex shape configuring the seal part 520 in the first stage first pressing step S21; therefore, it is possible to raise the strength of the completed seal part 520.

It should be noted that the technique of the present embodiment executing the first pressing step to impart work hardening to the entire region which becomes a convex shape configuring the seal part 520, and the second pressing step which press molds the region work hardened in the first pressing step so as to become a convex shape can be efficiently conducted by a progressive pressing method; however, it is not limited to a progressive pressing method, and will be a useful technique even in the case of another pressing method. In addition, this technique is a particularly useful technique upon forming the seal part 520 of a fuel cell separator 500 for which high strength is demanded, irrespective of the material metal plate being very thin.

(Piercing Step S30)

The piercing step will be explained using FIG. 14. The piercing step S30 is divided into two times to perform punching processes of holes on the elongated metal plate 100. The piercing step S30 includes the aforementioned fifth step S5 and sixth step S6. In this piercing step S30, the first piercing part 50 and second piercing part 60 are used as the pressing parts 4.

FIG. 14 shows a flowchart of the piercing step S30. The piercing step S30 includes a first piercing step S31, conveying step S32 and second piercing step S33.

First, in the first piercing step S31, the first piercing part 50 punches a part of the holes in portions to become the hole parts of the separator 500. Herein, four portions to become coolant communication holes 540 are punched. This step corresponds to the aforementioned fifth step S5.

Next, in the conveying step S32, the conveying part 2 conveys the elongated metal plate 100 by the feed amount which is the first predetermined distance L1 in the longitudinal direction.

Next, in the second piercing step S33, the second piercing part 60 punches the remaining holes which had not been punched by the first piercing part 50, among the portions to become the hole parts of the separator 500. Herein, six portions which become the gas communication holes 530 are punched.

The piercing step is a step in which the most stress acts on the elongated metal plate 100. In the present embodiment, by dividing the step of punching holes into a plurality of times, it prevents the elongated metal plate 100 from deflecting from punching.

(Trimming and Discharging Step S40)

The trimming and discharging step S40 will be explained using FIGS. 15 to 20. In the trimming and discharging step S40, the separator shaped part 600 is cut loose from the elongated metal plate 100, and the cut loose separator shaped part 600 and the portion 100B which becomes scrap of the elongated metal plate 100 are discharged. The trimming and discharging step S40 includes the aforementioned seventh step S7 and eighth step S8. In this trimming and discharging step S40, the trimming part 70 and scrap cutting part 80 are used as pressing parts 4.

FIG. 15 shows a flowchart of the trimming and discharging step S40. The trimming and discharging step S40 includes a conveying step S41, trimming step S42 (scrap cutting step S42), and lifting-up step S43 (discharging step S43).

FIG. 16 is a plan view of the elongated metal plate 100 which is conveyed by the conveying part 2. The portions illustrated with the reference numbers 150, 160, 170, 180 are respectively portions of the elongated metal plate 100 after processed by the first piercing part 50, second piercing part 60, trimming part 70, and scrap cutting part 80. The portion of reference number 170 becomes the completed separator shaped part 600 (product part). FIG. 17 also shows the position of the portion configuring the discharging part 240 which includes the conveyor 260 arranged under the elongated metal plate 100.

FIGS. 17A to 17D are views for explaining the flow of the trimming and discharging step S40. FIGS. 17A to 17D schematically show the lower mold 71 and upper mold 72 (outer periphery piercing punch 72) configuring the trimming part 70, the upper mold 82 of the scrap cutting part 80 (scrap cutter 82), lifting part 3, and discharging part 240. The discharging part 240 includes the mobile discharging part 250 and conveyor 260. The mobile discharging part 250 includes a cylinder 251, a base 252 fixed to the cylinder 251, and a roller 253 provided to the base. The discharging part 240 has a function as a separator shaped part conveying part 240.

Figure 17A:
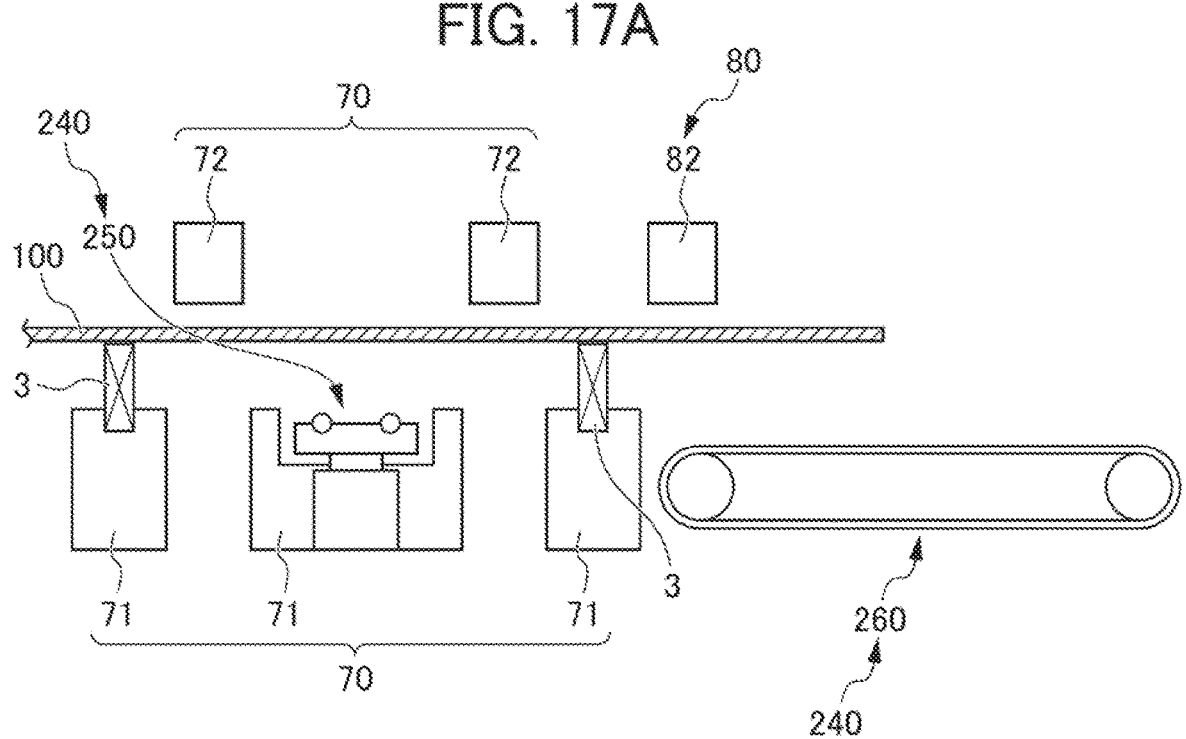
FIG. 17A is a schematic diagram for explaining the flow of trimming and discharging step.

As shown in FIG. 17A, in the conveying step S41, the elongated metal plate 100 which was press molded by the pressing step by each pressing part 4 in the region 190 to become the product part is conveyed to the trimming part 70. During conveying, the elongated metal plate 100 is lifted up by the lifting part 3. As mentioned above, by the region 190 which becomes the product part conveyed to the trimming part 70 being cut loose from the elongated metal plate 100, the process advances to a state which becomes the separator shaped part 600.

Figure 17B:
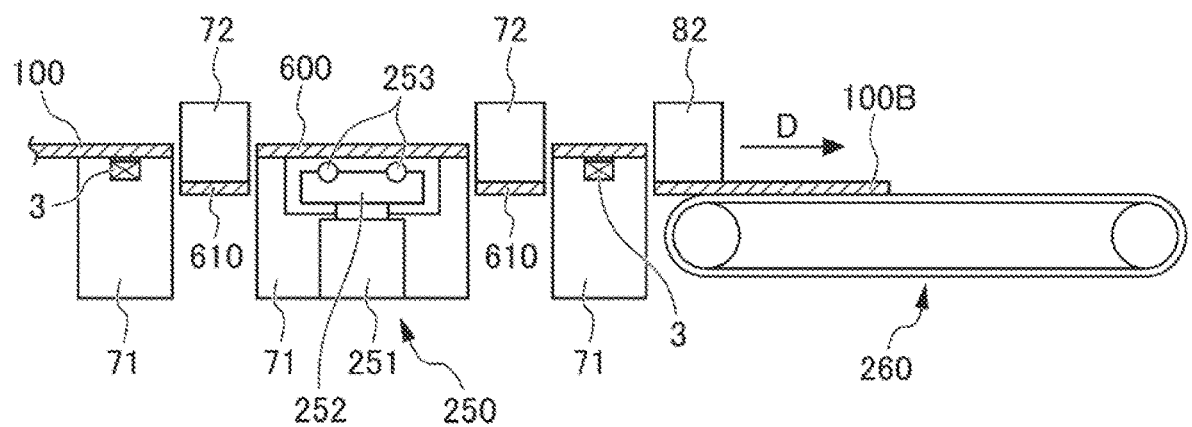
FIG. 17B is a schematic diagram for explaining the flow of trimming and discharging step.

Next, as shown in FIG. 17B, in the trimming step S42, the lifting part 3 lowers down, and the trimming part 70 punches the outer peripheral part 610 of the separator shaped part 600 formed in the elongated metal plate 100. The separator shaped part 600 is thereby cut loose from the elongated metal plate 100. It should be noted that, as shown in FIG. 16, a mode may be established which conducts partial punching of the outer peripheral part 610 of the separator shaped part 600 in a step before the trimming step S42, and punches the entirety of the outer peripheral part 610 of the separator shaped part 600 in the trimming step S42.

At this time, the scrap cutting step S42 is also executed at the same time, and the scrap cutting part 80 cuts the portion 100B which becomes scrap of the elongated metal plate 100 after the separator shaped part 600 was cut loose in the scrap cutting line 197.

Figure 17C:
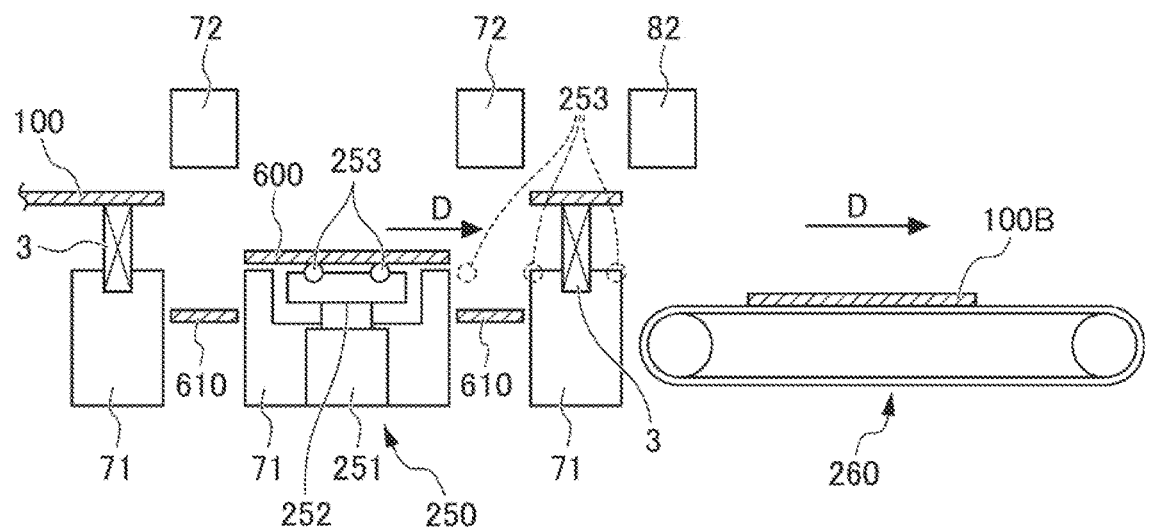
FIG. 17C is a schematic diagram for explaining the flow of trimming and discharging step.

Next, the lifting up step S43 and discharging step S43 are performed. In this step, as shown in FIG. 17C, the lifting part 3 lifts up the elongated metal plate 100 after the separator shaped part 600 has been cut loose. Then, at the midst of lifting up, first, the portion 100B which becomes scrap cut loose by the scrap cutting part 80 is discharged by the conveyor 260.

Figure 17D:
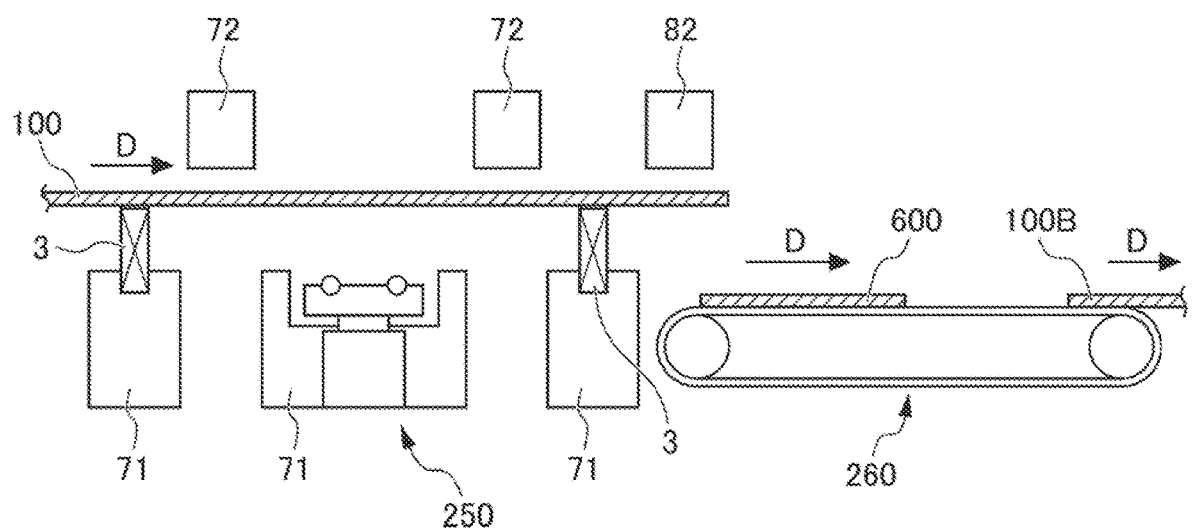
FIG. 17D is a schematic diagram for explaining the flow of trimming and discharging step.

Then, as shown in FIGS. 17C and 17D, the separator shaped part 600 cut loose by the trimming part 70 is discharged towards the conveying direction D by the roller 253 and conveyor 260. It should be noted that the roller 253 arranged at the lower mold 71 of the trimming part 70 rises in the discharging step S43 as shown in FIG. 17C, by driving of the cylinder 251. The separator shaped part 600 conveyed towards the conveying direction D by the roller 253 is conveyed until the conveyor 260 as shown in FIG. 17D. It should be noted that the roller 253 is also arranged at other arrangeable locations at the periphery of the lower mold 71.

The conveyor 260 discharges the separator shaped part 600. It should be noted that the lifting up of the lifting part 3 continuous until entering this state. In other words, in the midst of the elongated metal plate 100 being lifted up by the lifting up step S43, the conveying part 2 conveys the separator shaped part 600 which has been cut loose to the downstream side in the conveying direction D. It should be noted that the conveying part 2 conveys the elongated metal plate 100 by the predetermined feed amount, in preparation of the next step, in the midst of conducting this conveying step S43.

It is thereby possible to convey the separator shaped part 600 (product part) in the conveying direction D, without punching and dropping. Consequently, managing the product part ahead in the conveying direction D becomes easy.

Figure 18:
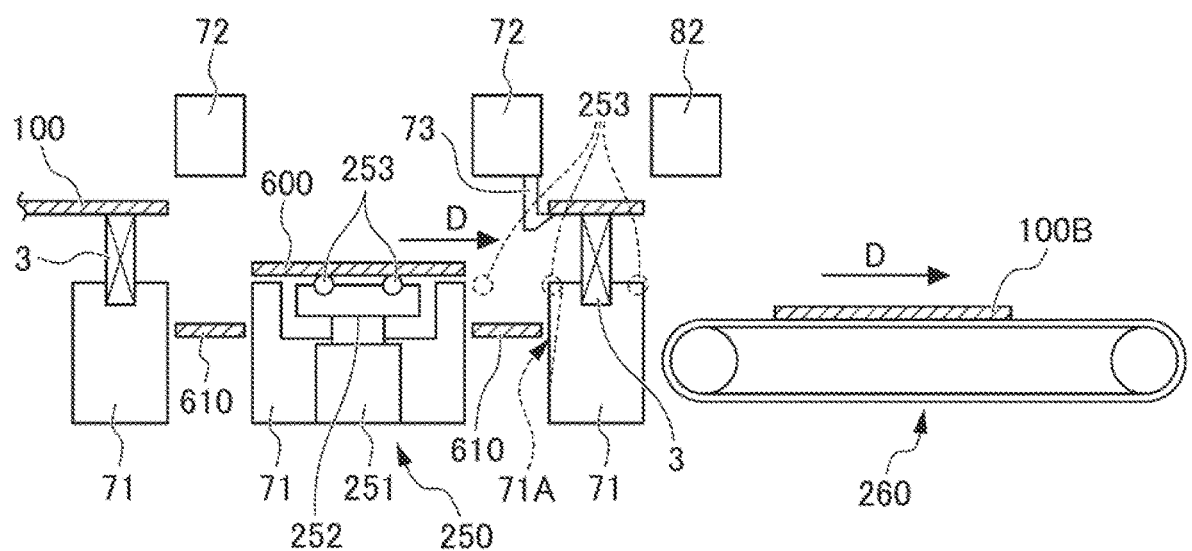
FIG. 18 is a schematic diagram when providing a hook part to an upper mold of a trimming part.

It should be noted that, as shown in FIG. 18, a hook 73 for lifting up the elongated metal plate 100 from which the separator shaped part 600 was cut loose may be provided to the upper mold 72 of the trimming part 70. Since the elongated metal plate 100 is very thin, it may bend by lifting up by only the lifting part 3. Therefore, by hanging the elongated metal plate 100 from which the separator shaped part 600 was cut loose using the hook 73, it is possible to aid the lifting up of the elongated metal plate 100. It should be noted that the hook 73 may be used in place of the lifting part 3 arranged on the downstream side in the conveying direction of the trimming part 70.

It should be noted that the hook 73 is preferably mobile type upon hanging the elongated metal plate 100. For example, by connecting an actuator (not illustrated) to the hook 73, and controlling the actuator by the control part 5, the hook 73 may be made mobile.

In the present embodiment, by adopting such a configuration, in the trimming step S42, the trimming part 70 punches the outer peripheral part of the separator shaped part 600 formed in the elongated metal plate 100, in a pressing direction which is the same as the pressing step which is the first stage for forming the separator shaped part 600, and cuts loose the separator shaped part 600 from the elongated metal plate 100.

Then, the separator shaped part 600 has holes such as the gas communication hole 530 and coolant communication hole 540. These holes punched in the aforementioned piercing step, and the outer peripheral part of the separator shaped part 600 punched in the trimming step S42 are punched in the same punching direction. The direction of burring occurring at the outer peripheral part and holes of the separator shaped part 600 are thereby the same direction, and thus subsequent deburring work, etc. is easy.

Then, the separator shaped part 600 has convex parts such as the gas flow channel part 510 and seal part 520. The gas flow channel part 510 and seal part 520 are molded in the aforementioned pressing step, so that the upper side becomes a convex shape. Then, the outer peripheral part of the separator shaped part 600 punched in the trimming step S42 is punched in the same pressing direction as the aforementioned pressing step.

Figure 19A:
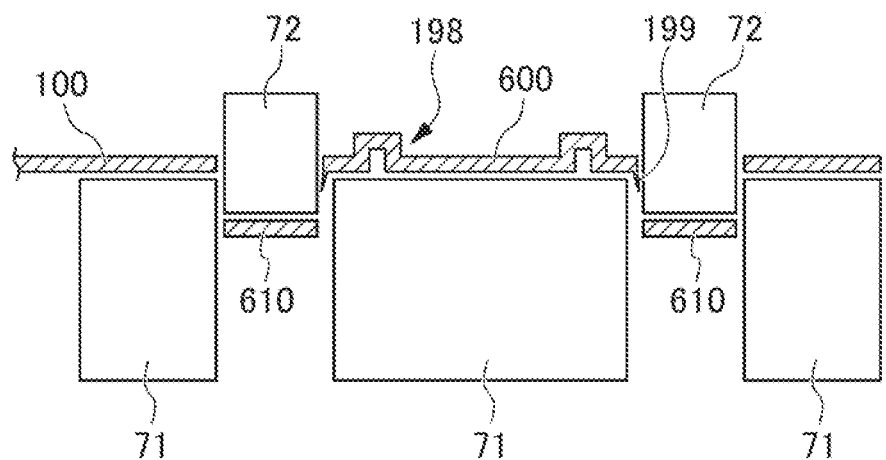
FIG. 19A is a view schematically showing a trimming process.
Figure 20A:
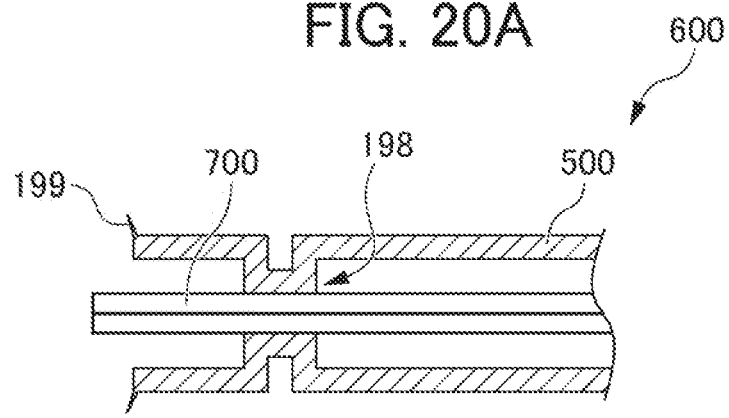
FIG. 20A is a view when assembling the separator and a gasket.

This situation will be explained using FIG. 19A. In the present embodiment, the direction in which ejection molding the convex parts 198 which configure the gas flow channel part 510 and seal part 520 and the facing direction of burrs 199 become opposite directions. As shown in FIG. 20A, when assembling the separator 500 and gasket 700, the burrs 199 will thereby face the opposite direction as the gasket 700. Consequently, even without considering the burrs 199, it is possible to suppress a situation such that the burrs 199 and gasket will interfere. Consequently, it is possible to prevent damage of this gasket.

Figure 19B:
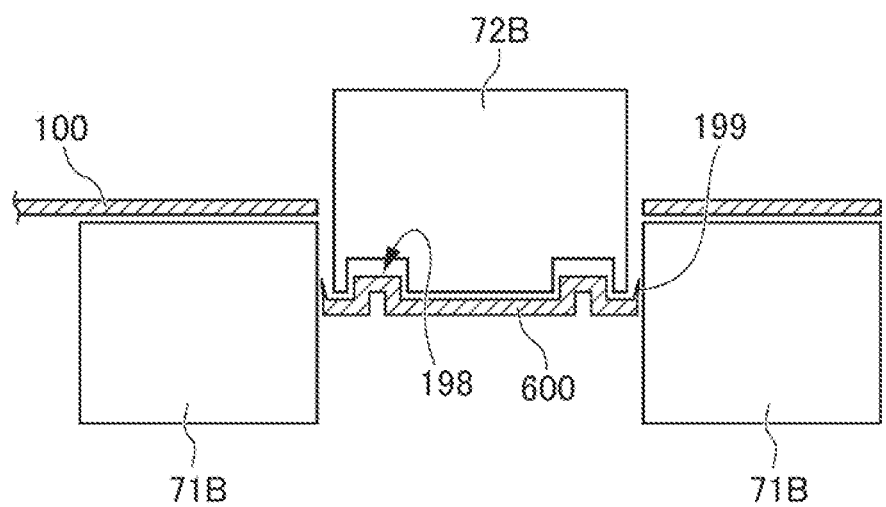
FIG. 19B is a view schematically showing a trimming step, which is a comparative example.
Figure 20B:
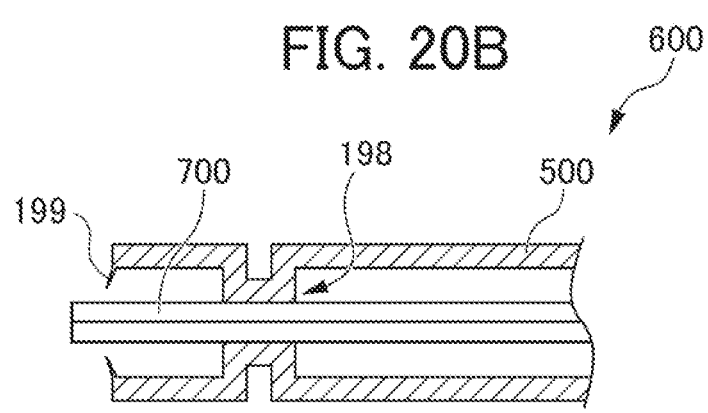
FIG. 20B is a view when assembling the separator and a gasket, which is a comparative example.

FIG. 19B is a comparative example. As in this comparative example, if adopting a configuration which punches the separator shaped part 600 from above using the lower mold 71B and upper mold 72B, the direction of ejection molding the convex parts 198 configuring the gas flow channel part 510 and seal part 520 and the direction of burrs 199 become the same direction. In this case, as shown in FIG. 20B, when assembling the separator 500 and gasket 700, the burrs 199 face the direction of the gasket. Consequently, a situation arises in which the separator 500 and gasket 700 can interfere.

(Configuration and Operation of Lifting Part 3)

Next, the configuration of the lifting part 3 and operating contents thereof will be explained using FIGS. 21 and 22. The lifting part 3 is a mechanism for lifting up and lowering down the elongated metal plate 100 conveyed by the conveying part 2, in order to make the conveying of the elongated metal plate 100 and the pressing process on the elongated metal plate 100 smoother and appropriate processes.

Although the lifting part 3 is arranged in the vicinity of each pressing part 4, such as between respective pressing parts 4, herein, a configuration of a lifting part 3 in the vicinity of the second piercing part 60 will be explained to represent these. This configuration can also be adopted in the lifting part 3 arranged at another position. However, the lifting part 3 of the present embodiment exhibits a particularly high effect in the piercing step which is a step in which high positioning precision is required, and intense stress acts on the elongated metal plate 100. A high effect is also exhibited in the pressing step of performing pressing on the region 190 which becomes the product part.

Figure 21:
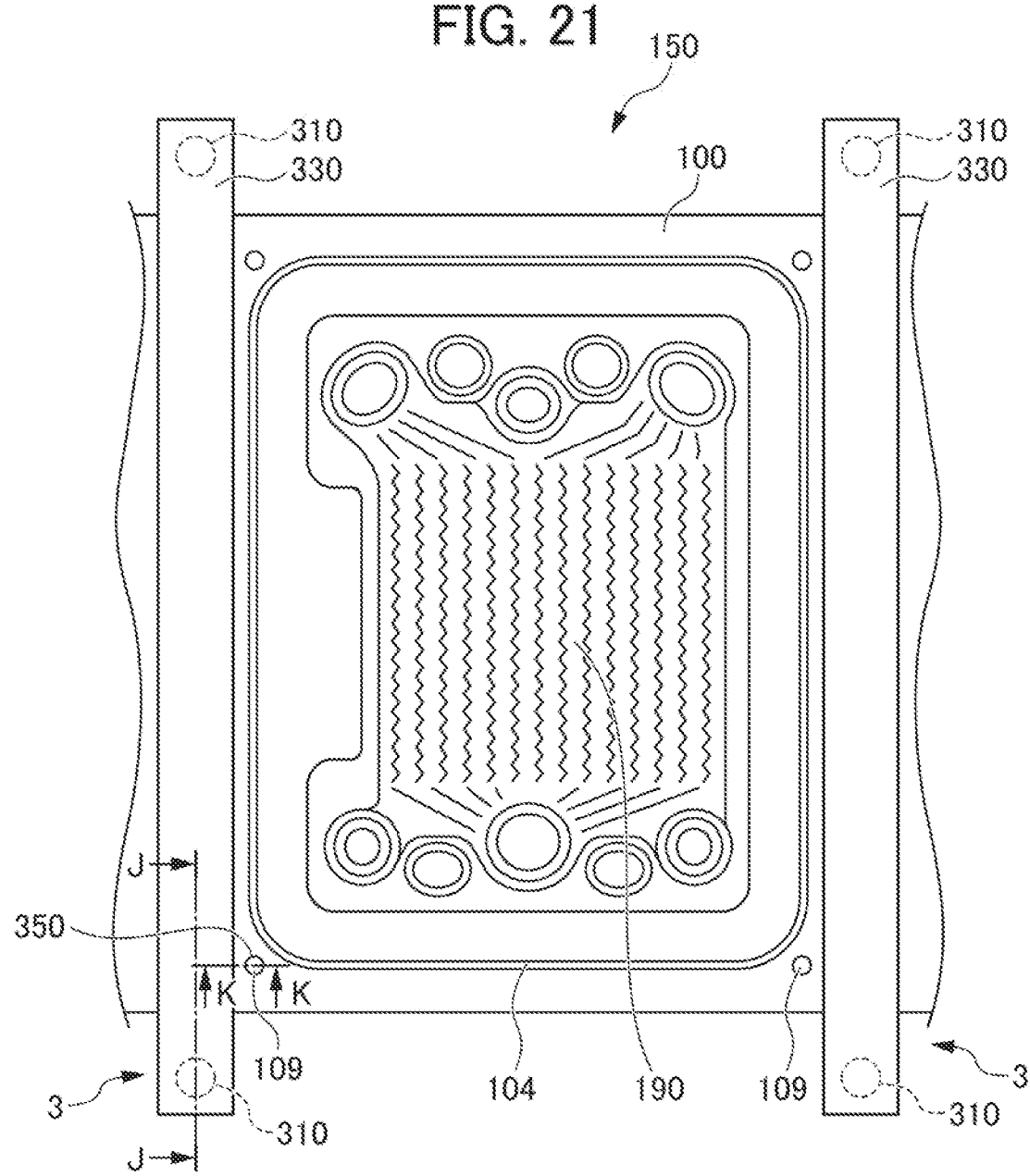
FIG. 21 is a plan view of a lifting part arranged at a first piercing part.

FIG. 21 is a plan view of the lifting part 3 arranged at the first piercing part 50. FIG. 22 is a schematic drawing for explaining the configuration of the lifting part 3 and the operating contents thereof. FIG. 22 shows a cross-sectional view of the lifting part 3 along the line K-K in FIG. 21, and a cross-sectional view in the vicinity of the positioning pin 350 along the line L-L in FIG. 21.

The lifting part 3 includes at least two lifting pins 310, a lifting plate 320 and an upper plate 330.

The lifting pins 310 are arranged at both sides in the short direction of the elongated metal plate. The lifting pin 310 has a leading end 311 which is abutted by the upper plate 330, and a stepped-part 312 on which placing the lifting plate. In addition, below the lifting pin 310, a first elastic body 313 which biases the lifting pin 310 upwards is provided. It should be noted that the lifting pin 310, etc. is provided to base members 341, 342 which serve as the base of the lifting part 3. The base members 341, 342 may be integrated with the lower mold of the pressing part 4, or may be formed integrally.

The lifting plate 320 places thereon the elongated metal plate 100 conveyed by the conveying part 2. The lifting plate 320 is provided so as to traverse the short direction of the elongated metal plate 100. The lifting plate 320 is placed on the stepped part 312 of the lifting pin 310, and moves in conjunction with vertical motion of the lifting pin 310. Below the lifting plate 320, a second elastic body 321 and push-up member 322 for biasing the lifting plate 320 upwards are provided. Herein, the biasing force upwards of the second elastic body 321 is greater than the biasing force upwards of the first elastic body 313.

The upper plate 330 holds the elongated metal plate 100 between the lifting plate 320. The bottom surface of the upper plate 330 abuts the leading end 311 of the lifting pin 310, and pushes down the lifting pin 310. It should be noted that the upper plate 330 may be integrated with the upper plate of the pressing part 4, or may be formed integrally.

Herein, a positioning pin 350 which engages with the positioning hole 109 provided in the elongated metal plate 100 is provided in the main apparatus. The positioning pin 350 may be a part of the lifting part 3, or may be provided to the lower mold of the pressing part 4 or the like. The positioning holes 109 are provided at intervals of the first predetermined distance L1, as shown in FIG. 3. By there being these positioning holes 109, the conveying part 2 accurately conveys by the feed amount of the first predetermined distance L1. In addition, the elongated metal plate 100 after conveying is positioned at an accurate position.

Figure 22:
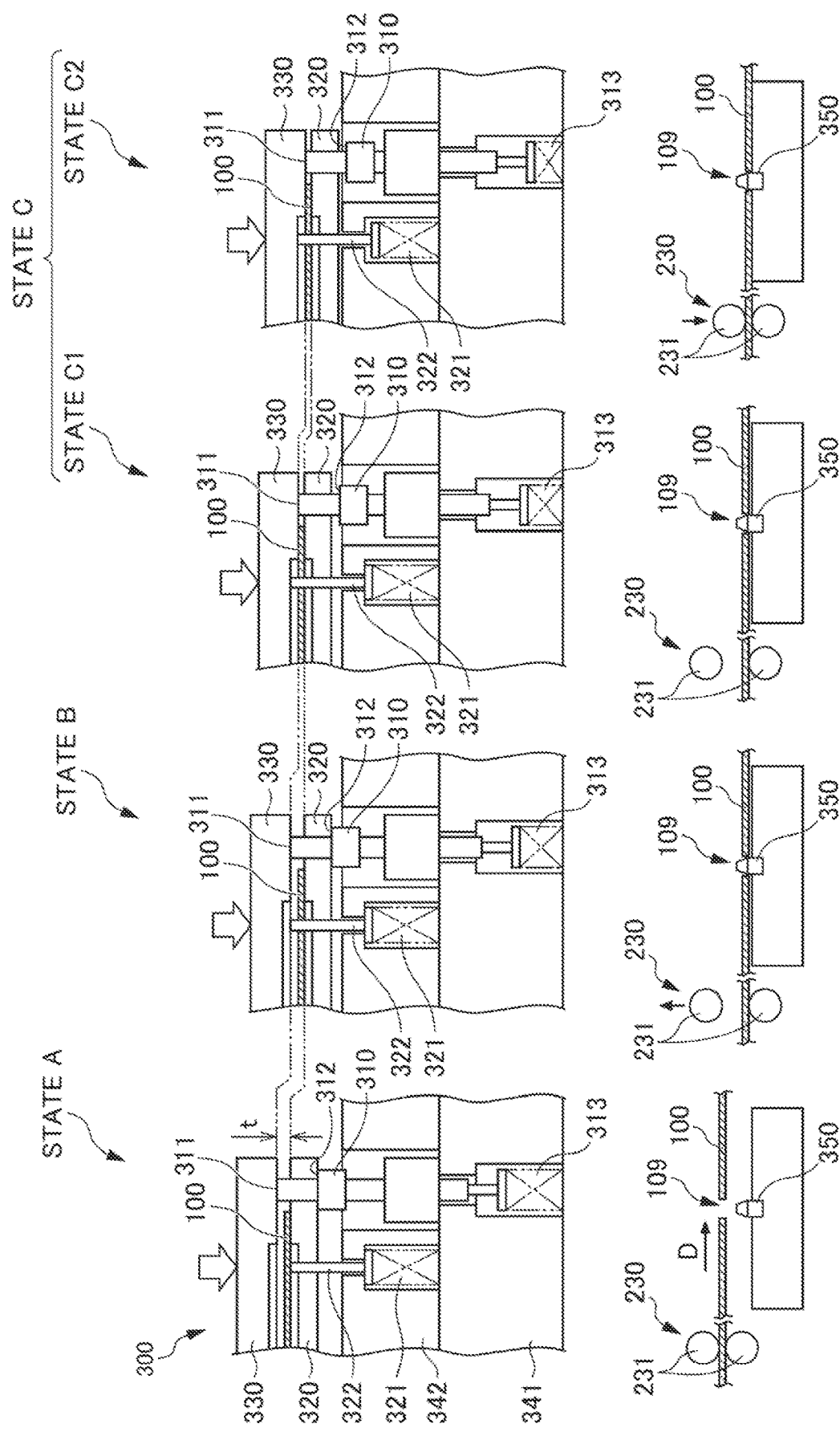
FIG. 22 is a schematic diagram for explaining the configuration of a lifting part and operating contents thereof.

The positioning part 3 is configured to be state variable between a first state A, second state B and third state C (states C1, C2), as shown in FIG. 22.

The first state A is a state separating a distance t between the lifting plate 320 and upper plate 330, so as not to sandwich the elongated metal plate 100 between the lifting plate 320 and upper plate 330, in a state in which the positioning pin 350 and positioning hole 109 are not engaging.

The second state B is a state separating a distance t between the lifting plate 320 and upper plate 330, so as not to sandwich the elongated metal plate 100 between the lifting plate 320 and upper plate 330, in a state in which the positioning pin 350 and positioning hole 109 are engaged.

The third state C (state C1, state C2) is a state reducing the distance t between the lifting plate 320 and upper plate 330, so as to sandwich the elongated metal plate 100 between the lifting plate 320 and upper plate 330, in a state in which the positioning pin 350 and positioning hole 109 are engaged.

Then, the lifting part 3 is configured so as to transition to the third state from the first state after going through second state, and the conveying part 2 conveys the elongated metal plate 100 when the lifting part 3 is in the first state A, and the pressing part performs pressing of the elongated metal plate 100 when the lifting part 3 is in the third state C.

Next, the details of operation of the lifting part 3 will be explained using FIG. 22.

The first state A includes a state in which the upper plate 330 abuts the leading end 311 of the lifting pin 310. This state is the top dead center state. The conveying part 2 conveys the elongated metal plate 100 when the lifting part 3 is this state.

The second state B includes a state in which the upper plate 330 pushes down the lifting pin 310 against the biasing force of the first elastic body 313, which is a state descending while maintaining a state in which the lifting plate 320 is placed on the stepped part 312 of the lifting pin 310.

The third state C includes a state in which the upper plate 330 pushes down the lifting pin 310 against the biasing force of the first elastic body, which is a state in which the stepped part of the lifting pin 310 is separated from the lifting plate 320. Furthermore, the third state includes a state C1 in which the upper plate 330 pushed down the lifting pin 310 against only the biasing force of the first elastic body 313, and a state C2 which is bottom dead center of the upper plate 330 pushing down the lifting pin 310 and lifting plate 320 against the biasing force of the first elastic body 313 and the biasing force of the second elastic body 321. In the case of the configuration where the lifting part 3 includes the second elastic body 321, preferably each pressing part 4 presses the elongated metal plate 100 when the lifting part 3 enters this state C2 of bottom dead center.

It should be noted that, as shown in the bottom drawing of FIG. 22, the feeder 230 of the conveying part 2 may be made to operate together with the operation of the lifting part 3. For example, the feeder 230 is configured to be state variable, in addition to the discharging state of discharging the elongated metal plate 100, between a discharging preparation state in which free movement of the elongated metal plate 100 is restricted, and a release state in which the elongated metal plate 100 has movement freedom. Then, the conveying part 2 establishes the feeder 230 in a discharging state, when the lifting part 3 is the first state A. Next, the conveying by the feeder 230 is stopped, and the feeder 230 is set in the release state and the lifting part 3 is established in the second state B. Next, until the upper plate 330 enters the state C1 pushing down the lifting pin 310 against only the biasing force of the first elastic body 313, in the third state C, the lifting part 3 preferably maintains the feeder 230 as is in the release state. Then, when the lifting part 3 enters the state C2 of bottom dead center, it enters a discharging preparation state in which free movement of the elongation metal plate 100 is restricted.

In the first state A, smooth conveying of the elongated metal plate 100 thereby becomes possible. In the second state B, since it is possible to engage the positioning hole 109 with the positioning pin 350 without tension acting on the elongated metal plate 100, it is possible to perform positioning with high precision. In the third state C2, it is possible to perform the pressing process in a state reliably positioning and holding the elongated metal plate 100. Consequently, it is possible to perform the pressing process in a state with very little deflection of the elongated metal plate 100.

It should be noted that the lifting plate 320 and upper plate 330 are provided so as to traverse the short direction of the elongated metal plate 100. It is thereby possible to perform the pressing process in a state reliably positioning and holding the elongated metal plate 100. Consequently, it is possible to perform the pressing process in a state with very little deflection of the elongated metal plate 100.

In addition, the portions of the lifting plate 320 and upper plate 330 sandwiching the elongated metal plate 100 are made in a frame shape, and the elongated metal plate 100 may be sandwiched in a state such that surrounds the region 190 which becomes the product part of the elongated metal plate 100. It is also thereby possible to perform the pressing process in a state reliably positioning and holding the elongated metal plate 100. Consequently, it is possible to perform the pressing process in a state with very little deflection of the elongated metal plate 100.

According to the present embodiment, the following effects are exerted.

(1) The progressive pressing method of the present embodiment is a progressive pressing method which molds a plurality of product parts in the elongated metal plate 100, and includes: the first bead molding step of molding the first bead 101A having a length of the second predetermined distance L2 extending in the longitudinal direction of the elongated metal plate 100, in a side part of the region 191 which becomes the first product part of the elongated metal plate 100; the first conveying step of conveying the elongated metal plate 100 by the feed amount which is the first predetermined distance L1 in the longitudinal direction; and the second bead molding step of molding the second bead 101B having a length of the second predetermined distance L2 extending in the longitudinal direction of the elongated metal plate 100, so as to connect with the first bead 101A molded in the first bead molding step, in a side part of the region 192 which becomes the second product part of the elongated metal plate 100, in which the second predetermined distance L2 is longer than the first predetermined distance L1. It is thereby possible to mold in a continuous and efficient process the bead 101 which serves as a molded part for raising the rigidity of the elongated metal plate 100.

(2) The progressive pressing method of (1) further includes the slit forming step of forming the slit 105 which extends in the short direction of the elongated metal plate 100, between the region 191 which becomes the first product part and the region 192 which becomes the second product part. It thereby becomes possible to effectively absorb the stress occurring in the elongated metal plate 100 during the processing process.

(3) The slit forming step of the progressive pressing method of (2) includes: the first slit forming step of forming the first slit 106 between the region 191 which becomes the first product part and the region 192 which becomes the second product part simultaneously with the first bead molding step; and the second slit forming step of forming the second slit 107 between the region 191 which becomes the first product part and the region 192 which becomes the second product part, simultaneously with the second bead molding step, in which the second slit 107 formed after the second slit forming step is formed to be lined up in the short direction with the first slit 106 formed by the first slit forming step. Problems such as distortion of the elongated metal plate 100 will thereby hardly occur, compared to a case of forming the slit 105 all at once.

(4) In the second slit forming step of the progressive pressing method of (3), the second slit 107 is formed at a position not overlapping with the first slit 106. The elongated metal plate 100 will thereby hardly deform during the second slit forming step.

(5) In the progressive pressing method of (2) to (4), in the first bead molding step, the first bead 101A is molded in both side parts of the region 191 which becomes the first product part, in both sides in the short direction of the elongated metal plate 100, and after the second bead molding step, further includes: the second conveying step of further conveying the elongated metal plate 100 by the feed amount of the first predetermined distance L1 in the longitudinal direction; and the third bead molding step of molding the third bead 104, so as to surround the periphery of the region 191 which becomes the first product part of the elongated metal plate 100 conveyed in the second conveying step, and so as to be surrounded by the first bead 101A and the slit 105 formed on the downstream side in the conveying direction of the region 191 which becomes the first product part. It is thereby possible to improve the effect of suppressing distortion occurring in the region 191 which becomes the product part, during the pressing process.

(6) In the progressive pressing method of (5), the part of the slit 105 formed on the downstream side in the conveying direction of the region 191 which becomes the first product part is formed simultaneously with the first bead molding step. By establishing a form which simultaneously executes a plurality of steps in this way, it is possible to achieve shortening of the processing time and a size reduction of the apparatus.

(7) The manufacturing method of fuel cell separators of the present invention includes the progressive pressing method of (1) to (6), in which the regions that become the first and second product parts are regions becoming the fuel cell separators 500. In the case of manufacturing fuel cell separators, it is possible to mold by a continuous and efficient process the molded part for raising the rigidity of the elongated metal plate 100.

(8) The progressive pressing device of the present invention is the progressive pressing device 1 which molds a plurality of product parts in the elongated metal plate 100, and includes: the bead molding part 11 that molds the bead 101 having a length of the second predetermined distance L2 extending in the longitudinal direction of the elongated metal plate 100, in a side part of the region 190 which becomes the product part of the elongated metal plate 100; and the conveying part 2 that conveys the elongated metal plate 100 by the feed amount which is the first predetermined distance L1 in the longitudinal direction, in which the second predetermined distance L2 is longer than the first predetermined distance L1. It is thereby possible to mold in a continuous and efficient process a molded part for raising the rigidity of the elongated metal plate 100.

(9) The progressive pressing device 1 of (8) further includes the slit forming part 15 which forms the slit 105 extending in the short direction of the elongated metal plate 100, in the upstream side in the conveying direction and the downstream side in the conveying direction of the region 190 which becomes the product part of the elongated metal plate 100. It thereby becomes possible to effectively absorb the stress occurring in the elongated metal plate 100 during the pressing process.

(10) The slit forming part 15 of the progressive pressing device 1 of (9) includes: the first slit forming section 16 which forms the first slit 106 in the upstream side in the conveying direction of the region 190 which becomes the product part; and the second slit forming section 17 which forms the second slit 107 in the downstream side in the conveying direction of the region 190 which becomes the product part, in which the first slit forming section 16 and second slit forming section 17 are arranged to be separated by the first predetermined distance L1. Problems such as deflection of the elongated metal plate 100 will thereby hardly occur, compared to a case of forming the slit 105 all at once.

(11) The second slit forming section 17 of the progressive pressing device 1 of (10) forms the second slit 107 at a position lined up in the short direction with the first slit 106, and not overlapping with the first slit 106 formed by the first slit forming section 16. The elongated metal plate 100 will thereby hardly deform during the second slit forming step.

(12) The first slit forming section 16 and second slit forming section 17 of the progressive pressing device 1 of (11) form the first slit 106 and second slit 107 so that the remainder 108 of the elongated metal plate 100 existing between the first slit 106 formed by the first slit forming section 16 and the second slit 107 formed by the second slit forming section 17 has the curved part 108A. The curved part 108A thereby becomes able to more effectively absorb stress occurring in the elongated metal plate 100, during subsequent pressing processes by each pressing part 4.

(13) The first slit forming section 16 and second slit forming section 17 of the progressive pressing device 1 of (12) form the first slit 106 and second slit 107, so that the remainder 108 of the elongated metal plate 100 has: the first withdrawn part 108B which connects with the region 191 that becomes the first product part and extends towards the upstream side in the conveying direction; the intermediate part 108C which is connected by one end side on the upstream side in the conveying direction of the first withdrawn part 108B and extends in the short direction; and the second withdrawn part 108D which connects with the other end side of the intermediate part 108C, and extends towards the upstream side in the conveying direction to connect with the region 192 that becomes the second product part. The first slit 106 and second slit 107 thereby become able to more effectively absorb the stress generated in the elongated metal plate 100, during the subsequent pressing process by each pressing part 4.

(14) The bead 101 molded by the bead molding part 11 of the progressive pressing device 1 of (9) to (13) is molded at both side parts of the region 190 which becomes the product part, in both ends in the short direction of the elongated metal plate 100, and the third bead molding part 30 which molds the third bead 104 of a shape surrounding the periphery of the region 190 which becomes the product part, and is surrounded by the bead 101 formed by the bead molding part 11 and the slit 105 formed by the slit forming part is arranged on the downstream side in the conveying direction of the slit forming part. It is thereby possible to improve the effect of suppressing deflection occurring in the region 190 which becomes the product part, during the pressing process.

(15) The manufacturing apparatus 1 for fuel cell separators of the present invention is a manufacturing apparatus including the progressive pressing device of (8) to (14), in which the region 190 that becomes the product part is a region that becomes the fuel cell separator 500. In the case of manufacturing fuel cell separators 500, it is possible to mold by a continuous and efficient process the molded part for raising the rigidity of the elongated metal plate 100.

In addition, according to the present embodiment, the following effects are exerted.

(1) The manufacturing method for fuel cell separators 500 of the present embodiment is a manufacturing method for the fuel cell separators 500 having the seal part 520 of convex shape which is pushed when overlapped with another separator, and includes: a first pressing step of imparting work hardening to the entire region which becomes a convex shape configuring the seal part 520; and the second pressing step of press molding so that the region work hardened in the first pressing step becomes a convex shape. It is thereby possible to improve the strength of the convex-shaped seal part 520.

(2) The manufacturing method for fuel cell separators 500 of the present embodiment is a manufacturing method of the fuel cell separators 500 having the gas flow channel part 510, and the seal part 520 of convex shape which is pushed when overlapped with another separator, the method including: the first pressing step of press molding the region which becomes the gas flow channel part 510 into the first gas flow channel shape 511, and press molding the region which becomes the seal part 520 into the first seal part shape 521; and the second pressing step of press molding the first gas flow channel shape 511 into the second gas flow channel shape 512, and press molding the first seal part shape 521 into the second seal part shape 522, in which the first pressing step performs press molding so that the region press molded in the first seal part shape 521 is uniformly imparted with more work hardening than the region press molded into the first gas flow channel shape 511. It is thereby possible to ensure high strength in the completed seal part 520, while simultaneously molding the gas flow channel part 510 and seal part 520 by performing two-stage pressing with both portions of the gas flow channel part 510 and seal part 520 as targets.

(3) The manufacturing method for fuel cell separators 500 of (2) performs press molding in the first pressing step so that the upper surface of the first seal part shape 521 becomes a circular arc shape which is convex upwards. It is thereby possible to impart work hardening to the entire region which becomes the convex shape configuring the seal part 520, in the first pressing step.

(4) The manufacturing method for fuel cell separators 500 of (2) or (3) conducts press molding in the first pressing step so that the upper surface of the first seal part shape 521 is substantially uniformly imparted with work hardening. It is thereby possible to improve the strength of the convex-shaped seal part 520.

(5) The manufacturing apparatus 1 for fuel cell separators of the present invention is a manufacturing apparatus which manufactures the fuel cell separator 500 having the seal part 520 of convex shape which is pushed when overlapped with another separator, and includes the first pressing part 30 which imparts work hardening to the entire region that becomes a convex shape configuring the seal part 520; and the second pressing part 40 which press molds the region which was work hardened by the first pressing part 30 so as to become a convex shape. It thereby possible to impart work hardening to the entire region which becomes the convex shape configuring the seal part 520 in the first pressing step, and becomes possible to arrange the shape of the seal part 520 so as to be able to ensure the strength of the completed seal part 520 in the second pressing step.

In addition, according to the present embodiment, the following effects are exerted.

(1) The manufacturing method for fuel cell separators of the present embodiment is a manufacturing method for fuel cell separators by a progressive pressing method which molds a plurality of separator shaped parts 600 in the elongated metal plate 100, the method including: the pressing step of forming the separator shaped part 600 by pressing in the elongated metal plate 100; the trimming step of cutting loose the separator shaped part 600 from the elongated metal plate 100 by notching in the same pressing direction as the pressing step the outer peripheral part 610 of the separator shaped part 600 formed in the elongated metal plate 100; the lifting step of lifting up the elongated metal plate 100 from which the separator shaped part 600 was cut loose; and the separator shaped part conveying step of conveying the cut loose separator shaped part 600 to the downstream side in the conveying direction, in the midst of the elongated metal plate 100 being lifted up in the lifting step. It is thereby possible to provide a manufacturing method of fuel cell separators that molds by way of a progressive pressing method that can appropriately execute discharge of the separator shaped part 600 as the product part, while considering the occurrence of burrs 199 generated by the punching.

(2) In the manufacturing method for fuel cell separator of (1), the separator shaped part 600 has the holes 530, 540, and the holes 530, 540 and the outer peripheral part 610 of the separator shaped part 600 are punched in the same punching direction in the pressing step and trimming step. It is thereby possible to make the processing work of burrs 199 in subsequent steps easy, while enabling to efficiently manufacture the separator shaped part 600 in a progressive pressing method.

(3) In the manufacturing method for fuel cell separators of (1) or (2), the separator shaped part 600 has the convex part 198 molded so that the upper side becomes a convex shape in the pressing step. It thereby becomes possible to prevent interference between the burrs 199 generated by punching of the separator shaped part 600 and other members, upon assembling the convex part 198 of the separator shaped part 600 towards other members, while enabling the efficient manufacturing of the separator shaped part 600 in a progressive pressing method.

(4) In the lifting step of the manufacturing method for fuel cell separators of (1) to (3), the cut loose elongated metal plate 100 is lifted up using the hook 73 provided to the upper mold used for cutting loose the separator shaped part 600 in the trimming step. It is possible to easily lift up the elongated metal plate 100, by hanging the elongated metal plate 100 from which the separator shaped part 600 has been cut loose, using the hook 73.

(5) The manufacturing apparatus 1 for fuel cell separators of the present invention is the manufacturing apparatus 1 for fuel cell separators which molds a plurality of separator shaped parts 600 in the elongated metal plate 100 by way of a progressive pressing method, and includes: the pressing parts 30 to 60 which form the separator shaped parts 600 in the elongated metal plate 100 by way of pressing; the trimming part 70 which cuts loose the separator shaped parts 600 from the elongated metal plate 100 by notching the outer peripheral part 610 of the separator shaped part 600 formed in the elongated metal plate 100 in the same pressing direction as the pressing direction by the pressing parts 30 to 60; the lifting part 3 which lifts up the elongated metal plate 100 from which the separator shaped parts 600 were cut loose; and the separator shaped part conveying part 240 which conveys the cut loose separator shaped parts 600 to the downstream side in the conveying direction, in the midst of the elongated metal plate 100 being lifted up by the lifting part 3. It is thereby possible to provide a manufacturing apparatus 1 for fuel cell separators that molds by way of a progressive pressing method that can appropriately execute discharge of the separator shaped part 600 as the product part, while considering the occurrence of burrs 199 generated by the punching.

(6) In the manufacturing apparatus 1 of the fuel cell separator of (5), the separator shaped part 600 has the holes 530, 540, and the punching direction of the holes 530, 540 by the pressing parts 50, 60 and the punching direction of the outer peripheral part 610 of the separator shaped part 600 by the trimming part 70 are the same punching direction. The processing work, etc. of the burrs 199 in a subsequent step thereby becomes easy, while enabling to efficiently manufacture the separator shaped part 600 in a progressive pressing method.

(7) In the manufacturing apparatus 1 for fuel cell separators of (5) or (6), the separator shaped part 600 has the convex part 198 molded so that the upper side becomes a convex shape by pressing with the pressing parts 30, 40. It thereby becomes possible to prevent interference between the burrs 199 generated by punching of the separator shaped part 600 and other members, upon assembling the convex part 198 of the separator 500 towards other members, while enabling to efficiently manufacture the separator shaped part 600 in a progressive pressing method.

(8) In the manufacturing apparatus 1 for fuel cell separators of (5) to (7), the hook 73 for lifting up the elongated metal plate 400 from which the separator shaped part 600 was cut loose is provided to the upper mold 72 of the trimming part 70. It is possible to easily lift up the elongated metal plate 100, by hanging the elongated metal plate 100 from which the separator shaped part 600 has been cut loose, using the hook 73.

In addition, according to the present embodiment, the following effects are exerted.

(1) The progressive pressing device 1 of the present embodiment is the progressive pressing device 1 which forms a plurality of product parts in the elongated metal plate 100, and includes: the pressing parts 4 which press the elongated metal plate 100; the conveying part 2 which conveys the elongated metal plate 100 in the longitudinal direction thereof; the positioning pin 350 which engages with the positioning hole 109 provided in the elongated metal plate 100; and the lifting part 3 which lifts the elongated metal plate 100 conveyed by the conveying part 2, in which the lifting part 3 includes: the lifting plate 320 on which the elongated metal plate 100 is placed, and the upper plate 330 which sandwiches the elongated metal plate 100 with the lifting plate 320; the lifting part 3 is configured to be state variable between the first state A, second state B and third state C; the first state A is a state separating a distance between the lifting plate 320 and upper plate 330 so as not to sandwich the elongated metal plate 100 between the lifting plate 320 and upper plate 330, in a state in which the positioning pin 350 and positioning hole 109 are not engaged; the second state B is a state separating a distance between the lifting plate 320 and upper plate 330 so as not to sandwich the elongated metal plate 100 between the lifting plate 320 and upper plate 330, in a state in which the positioning pin 350 and positioning hole 109 are engaged; the third state C is a state shortening a distance between the lifting plate 320 and upper plate 330 so as to sandwich the elongated metal plate 100 between the lifting plate 320 and upper plate 330, in a state in which the positioning pin 350 and positioning hole 109 are engaged; the lifting part 3 is configured so as to transition to the third state C from the first state A after going through the second state B; the conveying part 2 conveys the elongated metal plate 100 when the lifting part 3 is the first state A, and the pressing part 4 performs pressing of the elongated metal plate 100, when the lifting part 3 is the third state C. It is thereby possible to provide a progressive pressing device which can smoothly and appropriately execute conveying of the elongated metal plate 100 and the pressing process on the elongated metal plate 100.

(2) The conveying part 2 of the progressive pressing device 1 of (1) has a feeder 230 which feeds the elongated metal plate 100, in which the feeder 230 is configured to be state variable, in addition to a feeding state of feeding the elongated metal plate 100, between a feed preparation state in which free movement of the elongated metal plate 100 is restricted, and a release state in which the elongated metal plate 100 becomes free movement; and the conveying part 2 stops conveying by the feeder 230, establishing the feeder 230 in a release state, and the lifting part enters the second state. It is thereby possible to perform positioning with high precision due to being able to engage the positioning pin 350 and positioning hole 109, without tension acting on the elongated metal plate 100, in the second state B.

(3) The progressive pressing device 1 of (1) or (2) further includes: at least two lifting pins 310 having the leading end 311 abutted by the upper plate 330, and the stepped part 312 on which the lifting plate 320 is placed; and the first elastic body 313 biasing the lifting pin 310 upwards, in which the first state A includes a state in which the upper plate 330 abuts the leading end 311 of the lifting pin 310; the second state B includes a state in which the upper plate 330 pushes down the lifting pin 310 against the biasing force of the first elastic body 313, which is a state in which the lifting plate 320 descends while maintaining a state placed on the stepped part 312 of the lifting pin 310; the third state C includes a state in which the upper plate 330 pushes down the lifting pin 310 against the biasing force of the first elastic body 313, which is a state in which the stepped part 312 of the lifting pin 310 is separated from the lifting plate 320. According to such a mechanism, it is possible to provide a progressive pressing method which can smoothly and appropriately execute the conveying of the elongated metal plate 100 and the pressing process on the elongated metal plate 100.

(4) The progressive pressing device 1 of (3) further includes the second elastic body 321 biasing the lifting plate 320 upwards, in which the biasing force upwards of the second elastic body 321 is larger than the biasing force upwards of the first elastic body 313. It is thereby possible to configure a mechanism of the lifting part 3 that performs appropriate operation.

(5) In the progressive pressing device 1 of (4), the third state C has a state C1 in which the upper plate 330 pushes down the lifting pin 310 against only the biasing force of the first elastic body 313, and a state C2 of bottom dead center in which the upper plate 330 pushes down the lifting pin 310 and lifting plate 320 against the biasing force of the first elastic body 313 and the biasing force of the second elastic body 321, in which the pressing part 4 presses the elongated metal plate 100, when entering the state C2 of bottom dead center. Consequently, it is possible to perform the pressing process in a state with very little deflection of the elongated metal plate 100.

(6) At least two lifting pins 310 of the progressive pressing device 1 of (3) to (5) are provided at both sides in the short direction of the elongated metal plate 100. It is thereby possible to perform the pressing process in a state reliably positioning and holding the elongated metal plate 100. Consequently, it is possible to perform the pressing process in a state with very little deflection of the elongated metal plate 100.

(7) The lifting plate 320 and upper plate 330 of the progressive pressing device 1 of (1) to (6) is provided so as to traverse the short direction of the elongated metal plate 100. It is thereby possible to perform the pressing process in a state reliably positioning and holding the elongated metal plate 100. Consequently, it is possible to perform the pressing process in a state with very little deflection of the elongated metal plate 100.

(8) The lifting plate 320 and upper plate 330 of the progressive pressing device 1 of (1) to (6) are formed in a shape such that portions sandwiching the elongated metal plate 100 surround the region 190 which becomes the product part of the elongated metal plate 100. It is thereby possible to perform the pressing process in a state reliably positioning and holding the elongated metal plate 100. Consequently, it is possible to perform the pressing process in a state with very little deflection of the elongated metal plate 100.

(9) The upper plate 330 of the progressive pressing device 1 of (1) to (8) is integrated with the upper mold of the pressing part 4, or formed integrally. It is thereby possible to reduce the number of parts. In addition, the operating control of the apparatus for linking with the operation of the pressing parts 4 also becomes easy.

(10) The manufacturing apparatus 1 of the fuel cell separator of the present invention includes the progressive pressing device of (1) to (9), in which the region 190 which becomes the production part is a region which becomes the fuel cell separator 500. Also in the case of manufacturing the fuel cell separators 500, it is possible to smoothly and appropriately execute the conveying of the elongated metal plate 100 and pressing process on the elongated metal plate 100.

It should be noted that the present invention is not to be limited to the above-mentioned embodiments, and that, even if conducting modifications, improvements or the like within a scope that can achieve the object of the present invention, it will be encompassed by the scope of the present invention.

EXPLANATION OF REFERENCE NUMERALS

1 progressive pressing device (manufacturing apparatus for fuel cell separator)
2 conveying part
3 lifting part
4 pressing part
5 control part
10 bead and slit molding part (molding part)
11 bead molding part
15 slit forming part
16 first slit forming section
17 second slit forming section
30 first pressing part (third bead molding part)
31 lower mold
32 upper mold
40 second pressing part
41 lower mold
42 upper mold
50 first piercing part
60 second piercing part
70 trimming part
71 lower mold
72 upper mold
73 hook part
80 scrap cutting part
81 lower mold
82 upper mold
100 elongated metal plate
100B portion which becomes scrap
101 bead
101A first bead
101B second bead
104 third bead
105 slit
106 first slit
107 second slit
108 remainder
108A curved part
108B first withdrawn part
108C intermediate part
108D second withdrawn part
109 positioning hole
190 region which becomes product part
191 region which becomes first product part
192 region which becomes second product part
210 uncoiler
220 anti-deflection part
221 straightening roller
230 feeder
231 feed roller
240 discharging part (separator shaped part conveying part)
250 mobile discharging part
260 conveyor
310 lifting pin
311 leading end
312 stepped part
313 first elastic body
320 lifting plate
321 second elastic body
322 push-up member
330 upper plate
350 positioning pin
500 separator (fuel cell separator)
510 gas flow channel part
511 first gas flow channel shape
512 second gas flow channel shape
520 seal part
521 first seal part shape
522 second seal part shape
530 gas communication hole
540 coolant communication hole
600 separator shaped part (product part)
610 outer peripheral part

What is claimed is:

1. A manufacturing method for fuel cell separators by a progressive pressing method which molds a plurality of separator shaped parts in an elongated metal plate, the manufacturing method comprising:
    a pressing step of forming a separator shaped part by pressing in the elongated metal plate;
    a trimming step of cutting loose the separator shaped part from the elongated metal plate, by punching an outer peripheral part of the separator shaped part formed in the elongated metal plate, in a pressing direction which is the same as the pressing step;
    a lifting step of lifting up the elongated metal plate from which the separator shaped part was cut loose; and
    a separator shaped part conveying step of conveying the separator shaped part that was cut loose to a downstream side in a conveying direction, while the elongated metal plate being lifted up in the lifting step.

2. The manufacturing method for fuel cell separators according to claim 1, wherein the separator shaped part has a hole part, and the hole part and outer peripheral part of the separator shaped part are punched in the same punching direction in the pressing step and the trimming step.

3. The manufacturing method for fuel cell separators according to claim 1, wherein the separator shaped part has a convex part which is molded so that an upper side becomes a convex shape in the pressing step.

4. The manufacturing method for fuel cell separators according to claim 2, wherein the separator shaped part has a convex part which is molded so that an upper side becomes a convex shape in the pressing step.

5. The manufacturing method for fuel cell separators according to claim 1,
wherein the lifting step lifts up the elongated metal plate which was cut loose, using a hook part provided to an upper mold used in order to cut loose the separator shaped part in the trimming step.

6. The manufacturing method for fuel cell separators according to claim 2,
wherein the lifting step lifts up the elongated metal plate which was cut loose, using a hook part provided to an upper mold used in order to cut loose the separator shaped part in the trimming step.

7. The manufacturing method for fuel cell separators according to claim 3,
wherein the lifting step lifts up the elongated metal plate which was cut loose, using a hook part provided to an upper mold used in order to cut loose the separator shaped part in the trimming step.

8. The manufacturing method for fuel cell separators according to claim 4,
wherein the lifting step lifts up the elongated metal plate which was cut loose, using a hook part provided to an upper mold used in order to cut loose the separator shaped part in the trimming step.

* * * * *